(12) United States Patent
Kim et al.

(10) Patent No.: US 9,838,163 B2
(45) Date of Patent: Dec. 5, 2017

(54) METHOD FOR TRANSMITTING D2D SIGNAL AND APPARATUS FOR SAME

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 14/908,464

(22) PCT Filed: Aug. 6, 2014

(86) PCT No.: PCT/KR2014/007272
§ 371 (c)(1),
(2) Date: Jan. 28, 2016

(87) PCT Pub. No.: WO2015/020427
PCT Pub. Date: Feb. 12, 2015

(65) Prior Publication Data
US 2016/0173239 A1    Jun. 16, 2016

Related U.S. Application Data

(60) Provisional application No. 61/862,950, filed on Aug. 6, 2013, provisional application No. 61/863,898, filed on Aug. 8, 2013.

(51) Int. Cl.
*H04L 1/18* (2006.01)
*H04W 72/04* (2009.01)

(52) U.S. Cl.
CPC .......... *H04L 1/1861* (2013.01); *H04L 1/1812* (2013.01); *H04W 72/042* (2013.01)

(58) Field of Classification Search
CPC ... H04L 1/1861; H04L 1/1812; H04W 72/042
See application file for complete search history.

(56) References Cited

U.S. PATENT DOCUMENTS 8,842,611 B2 * 9/2014 Du ..................... H04L 1/1887
                                                         370/328
9,137,790 B2 * 9/2015 Chiu .................. H04W 72/042
(Continued)

FOREIGN PATENT DOCUMENTS

| KR | 10-2013-0065225 | 6/2013 |
| KR | 10-2013-0085300 | 7/2013 |
| WO | 2012/128490 | 9/2012 |

OTHER PUBLICATIONS

PCT International Application No. PCT/KR2014/007272, Written Opinion of the International Searching Authority dated Nov. 12, 2014, 20 pages.

*Primary Examiner* — Phuc Tran
(74) *Attorney, Agent, or Firm* — Lee Hong Degerman Kang Waimey

(57) ABSTRACT

The present invention relates to a wireless communication system. More specifically, the present invention relates to a method for performing an HARQ process by a first D2D terminal in a wireless communication system, and an apparatus for the same, the method comprising the steps of: receiving data from a second D2D terminal; transmitting an HARQ response for the data to the second D2D terminal; and when the HARQ response is NACK, receiving a retransmission signal for the data from a base station.

8 Claims, 32 Drawing Sheets

(56) References Cited

U.S. PATENT DOCUMENTS

| | | | | |
|---|---|---|---|---|
| 2008/0282126 A1* | 11/2008 | Chindapol | ............ | H04B 7/026 714/748 |
| 2011/0317569 A1 | 12/2011 | Kneckt et al. | | |
| 2013/0114533 A1 | 5/2013 | Ji et al. | | |
| 2014/0281782 A1* | 9/2014 | Tyrrell | ..................... | H04L 1/18 714/748 |
| 2015/0358062 A1* | 12/2015 | Skillermark | .......... | H04L 1/0026 370/329 |

* cited by examiner

METHOD FOR TRANSMITTING D2D SIGNAL AND APPARATUS FOR SAME

CROSS-REFERENCE TO RELATED APPLICATIONS

This application is the National Stage filing under 35 U.S.C. 371 of International Application No. PCT/KR2014/007272, filed on Aug. 6, 2014, which claims the benefit of U.S. Provisional Application No. 61/862,950, filed on Aug. 6, 2013 and 61/863,898, filed on Aug. 8, 2013, the contents of which are all hereby incorporated by reference herein in their entirety.

TECHNICAL FIELD

The present invention relates to a wireless communication system, and more particularly, to a method of transmitting and/or receiving a signal using D2D (device-to-device) communication in a wireless communication system and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DISCLOSURE OF THE INVENTION

Technical Task

An objective of the present invention is to provide a method of efficiently transmitting and/or receiving a signal using D2D (device-to-device) communication and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of performing a HARQ (hybrid automatic repeat request) procedure, which is performed by a first D2D (device-to-device) UE in a wireless communication system, includes the steps of receiving data from a second D2D UE, transmitting a HARQ response to the second D2D UE in response to the data and, if the HARQ response corresponds to NACK (negative acknowledgement), receiving a retransmission signal from a base station in response to the data.

Preferably, if the HARQ response corresponds to the NACK (negative acknowledgement), the method further include the step of receiving a retransmission indicator from the second D2D UE at first timing. In this case, second timing at which the retransmission signal received from the base station in response to the data can be determined based on the first timing.

Preferably, a CRC (cyclic redundancy check) of a PDCCH (physical downlink control channel) scheduling the data is masked with a group-RNTI (radio network temporary identifier) and the group-RNTI can be determined based on a group ID (identifier) of a group to which the first D2D UE and the second D2D UE belong thereto.

Preferably, if a plurality of data are continuously received from the first D2D UE, the HARQ response is transmitted in a subframe satisfying (10*SFN+SF) mod N=0 only. In this case, the SFN may correspond to a radio frame index, the SF may correspond to a subframe index in a radio frame, the mod may indicate a modulo calculation and the N may correspond to an integer equal to or greater than 2.

Preferably, if the HARQ response corresponds to ACK, transmission of the HARQ response signal can be omitted at timing assigned to transmit the HARQ response.

To further achieve these and other advantages and in accordance with the purpose of the present invention, according to a different embodiment, a first D2D (device-to-device) UE configured to perform a HARQ (hybrid automatic repeat request) procedure in a wireless communication system can include an RF (radio frequency) unit and a processor, the processor configured to receive data from a second D2D UE, the processor configured to transmit a HARQ response to the second D2D UE in response to the data, the processor, if the HARQ response corresponds to NACK (negative acknowledgement), configured to receive a retransmission signal from a base station in response to the data.

Preferably, if the HARQ response corresponds to the NACK (negative acknowledgement), the processor is configured to receive a retransmission indicator from the second D2D UE at first timing and second timing at which the retransmission signal received from the base station in response to the data can be determined based on the first timing.

Preferably, a CRC (cyclic redundancy check) of a PDCCH (physical downlink control channel) scheduling the data is masked with a group-RNTI (radio network temporary identifier) and the group-RNTI can be determined based on a group ID (identifier) of a group to which the first D2D UE and the second D2D UE belong thereto.

Preferably, if a plurality of data are continuously received from the first D2D UE, the HARQ response is transmitted in a subframe satisfying (10*SFN+SF) mod N=0 only. In this case, the SFN may correspond to a radio frame index, the SF may correspond to a subframe index in a radio frame, the mod may indicate a modulo calculation and the N may correspond to an integer equal to or greater than 2.

Preferably, if the HARQ response corresponds to ACK, transmission of the HARQ response signal can be omitted at timing assigned to transmit the HARQ response.

Advantageous Effects

According to embodiments of the present invention, it is able to provide a method of efficiently transmitting and/or receiving a signal using D2D (device-to-device) communication.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR INVENTION

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). 3rd Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
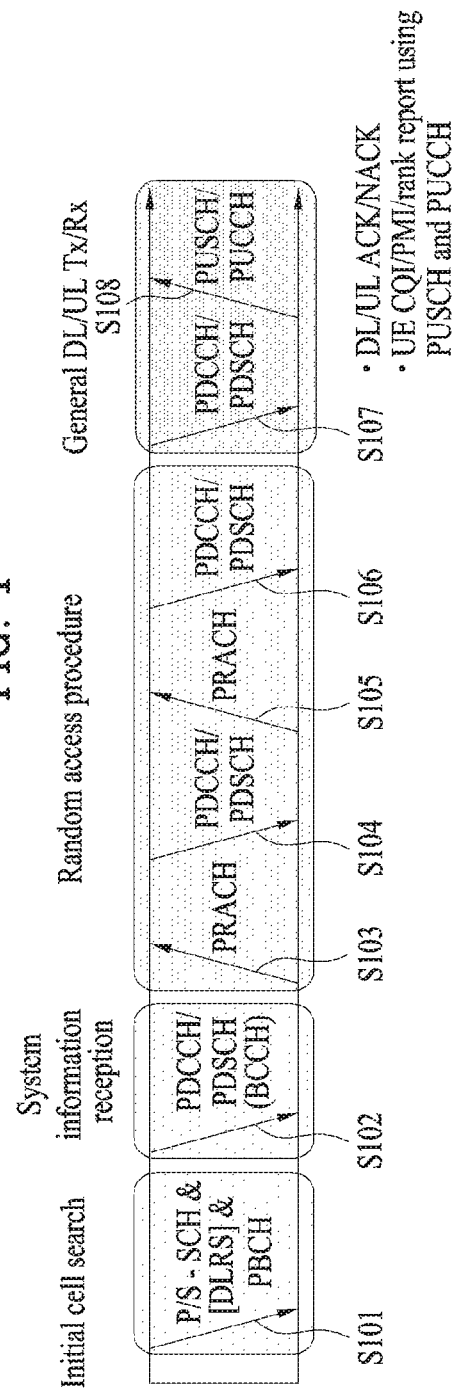
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
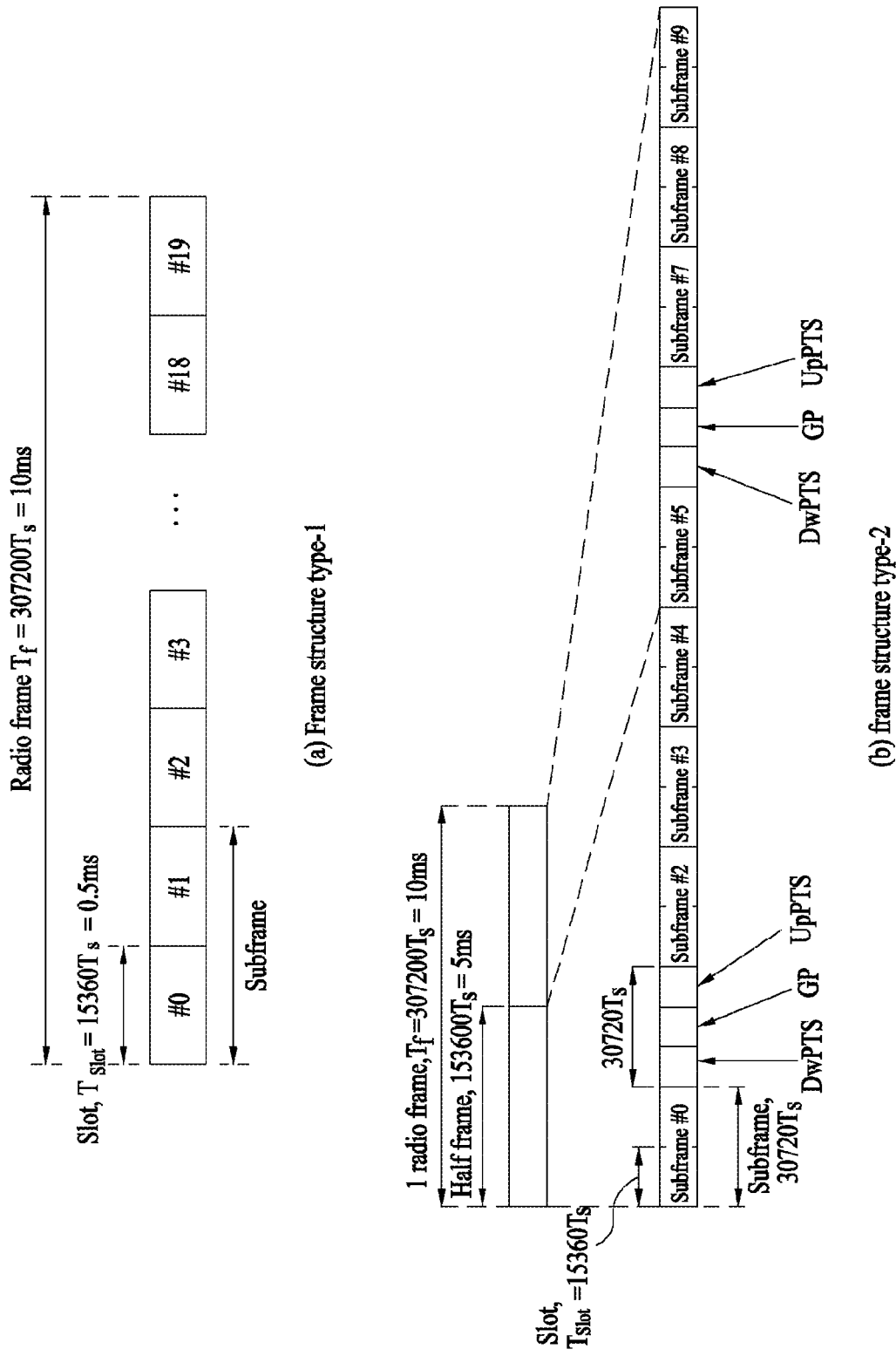
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL) SC-FDMA symbols in the time domain.

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

Figure 3:
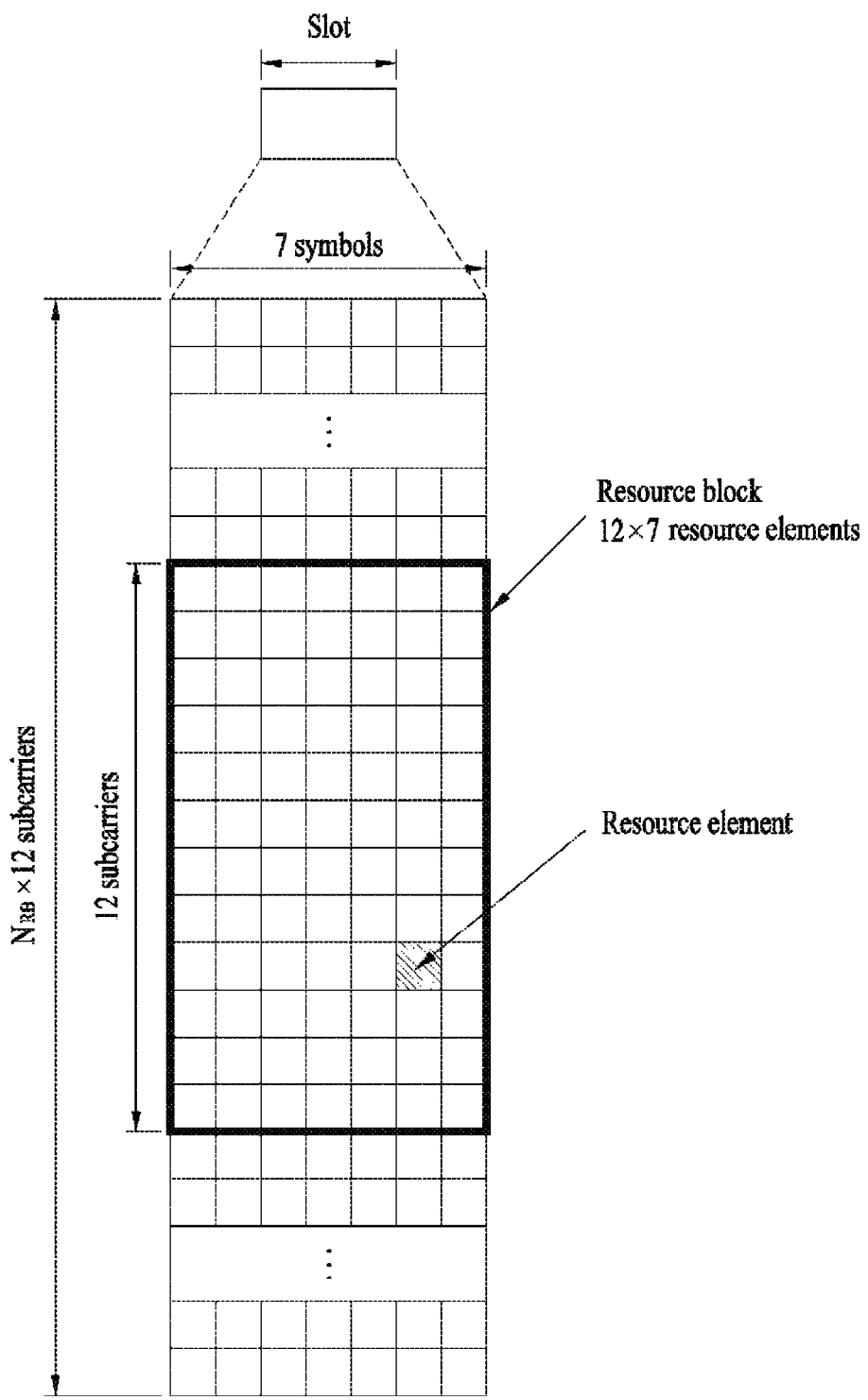
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
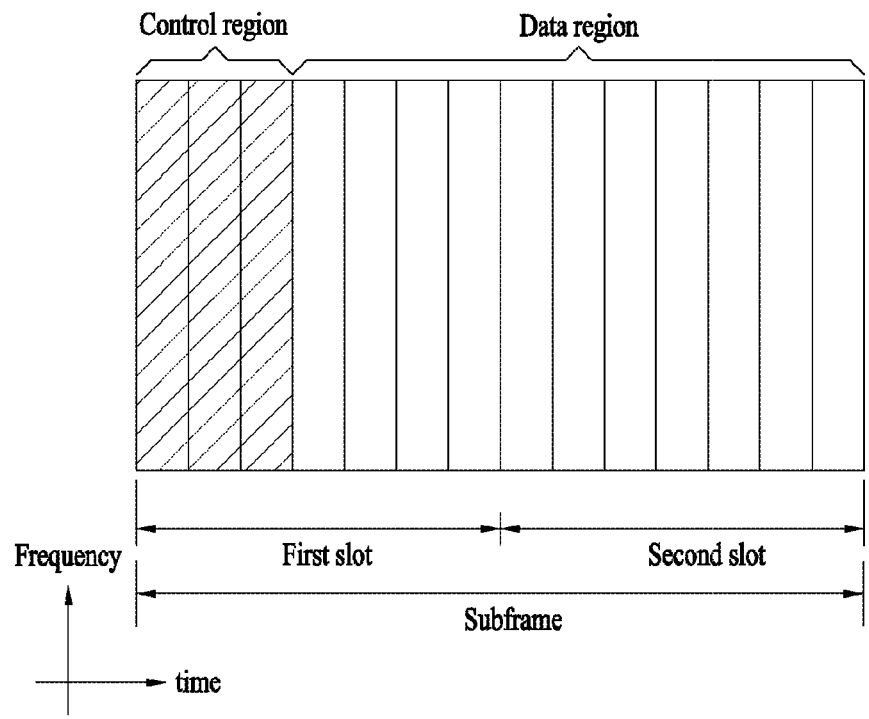
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

A base station determines a PDCCH format in accordance with DCI to be transmitted to a user equipment and attaches a CRC (cyclic redundancy check) to control information. The CRC is masked with a unique identifier (RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, the CRC can be masked with a system information identifier (e.g., SI-RNTI (system information-RNTI). If PDCCH is used for a random access response, the CRC can be masked with RA-RNTI (random access-RNTI).

Figure 5:
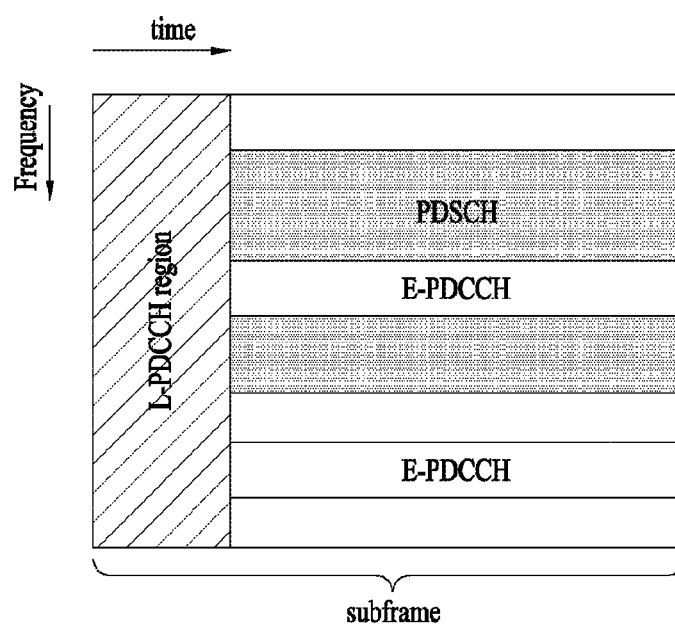
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS. A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
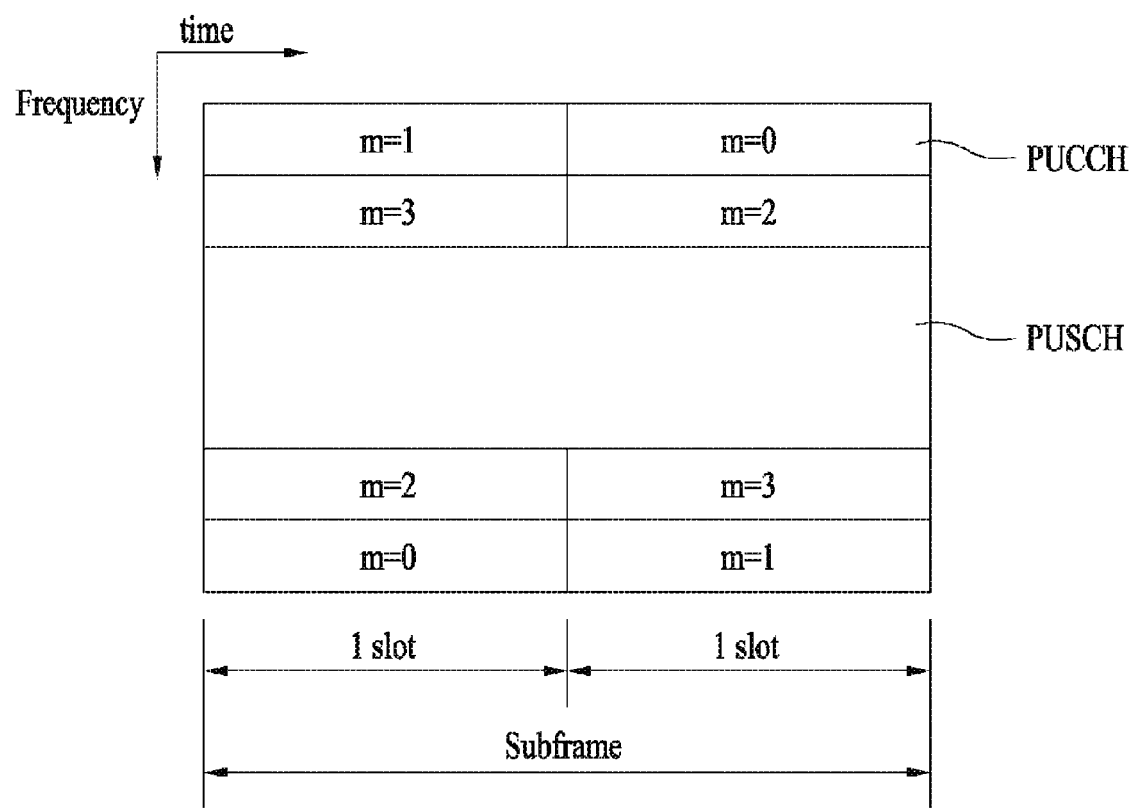
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.

Scheduling Request (SR): information used to request UL-SCH resources. The SR is transmitted in On-Off Keying (OOK).

HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response. The HARQ response includes a positive ACK, a negative ACK (NACK) and/or a DTX (discontinuous transmission).

Channel Quality Indicator (CSI): feedback information for a DL channel. MIMO-related feedback information includes an RI and a PMI. The CQI occupies 20 bits per subframe.

Figure 7:
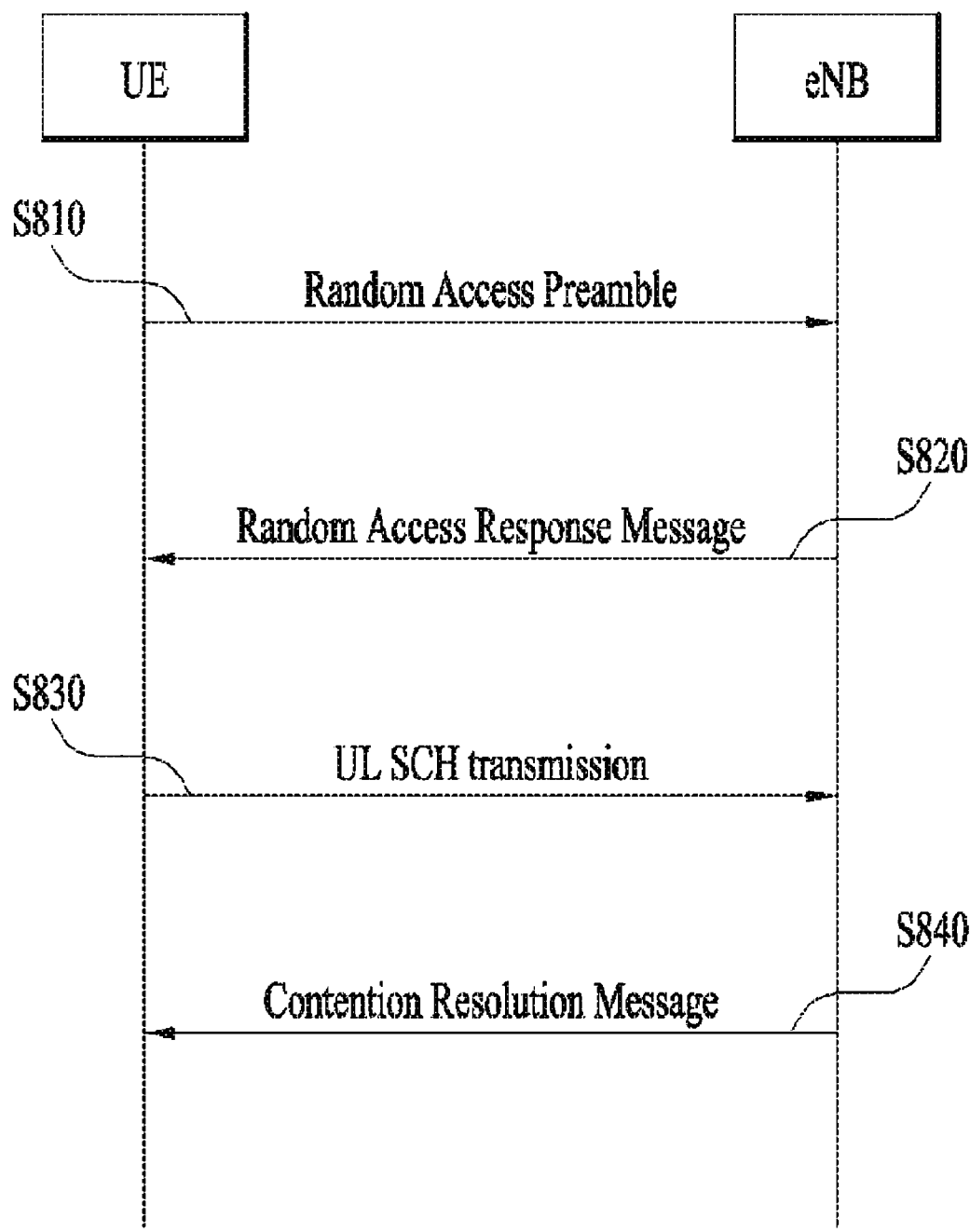
FIG. 7 is a diagram for a random access procedure.

FIG. 7 illustrates a random access procedure. The random access procedure is used to transmit UL short data. For example, upon occurrence of initial access in Radio Resource Control (RRC) IDLE mode, initial access after Radio Link Failure (RLF), or handover requiring random access, or upon generation of UL/DL data requiring random access in RRC CONNECTED mode, the random access procedure is performed. The random access procedure is performed in a contention-based manner or a non-contention-based manner.

Referring to FIG. 7, a UE receives random access information from an eNB by system information and stores the received random access information. Subsequently, when random access is needed, the UE transmits a random access preamble (message 1 or Msg1) to the eNB on a PRACH (S810). Upon receipt of the random access preamble from the UE, the eNB transmits a random access response message (message 2 or Msg2) to the UE (S820). Specifically, DL scheduling information for the random access response message is CRC-masked by a Random Access-RNTI (RA-RNTI) and transmitted on a PDCCH. Upon receipt of the DL scheduling signal masked by the RA-RNTI, the UE may receive the random access response message on a PDSCH. Then, the UE determines whether a Random Access Response (RAR) directed to the UE is included in the random access response message. The RAR includes a Timing Advance (TA), UL resource allocation information (a UL grant), a temporary UE ID, etc. The UE transmits a UL-SCH message (message 3 or Msg3) to the eNB according to the UL grant (S830). After receiving the UL-SCH message, the eNB transmits a contention resolution message (message 4 or Msg4) to the UE (S840).

As mentioned in the foregoing description, radio communication using a legacy LTE communication scheme intensively considers a communication scheme between a base station and a user equipment. Yet, a request for developing a D2D (device-to-device) communication technology is recently increasing. The D2D can be implemented in various ways ranging from a function of transmitting and receiving a simple signal (e.g., discovery signal) to a function (e.g., direct communication) of transmitting and receiving a high capacity file. It is able to perform various services using the D2D. For example, it is able to implement a group communication service enabling a plurality of users to perform communication at the same time based on a function that makes a single terminal transmit a signal or data to a plurality of specific or non-specific terminals. And, as an example of the D2D communication technology, it may use a UE that plays a role of a UE-based relay, i.e., a UE relay. For example, when D2D communication is unavailable, it is able to make a UE capable of performing a role of relaying among a plurality of candidate UEs perform communication relaying. Moreover, a function and a service can be extended to P2P (peer to peer) communication and M2M (many to many) communication and distributed communication can be performed in a manner of establishing a mesh network structure.

Figure 8:
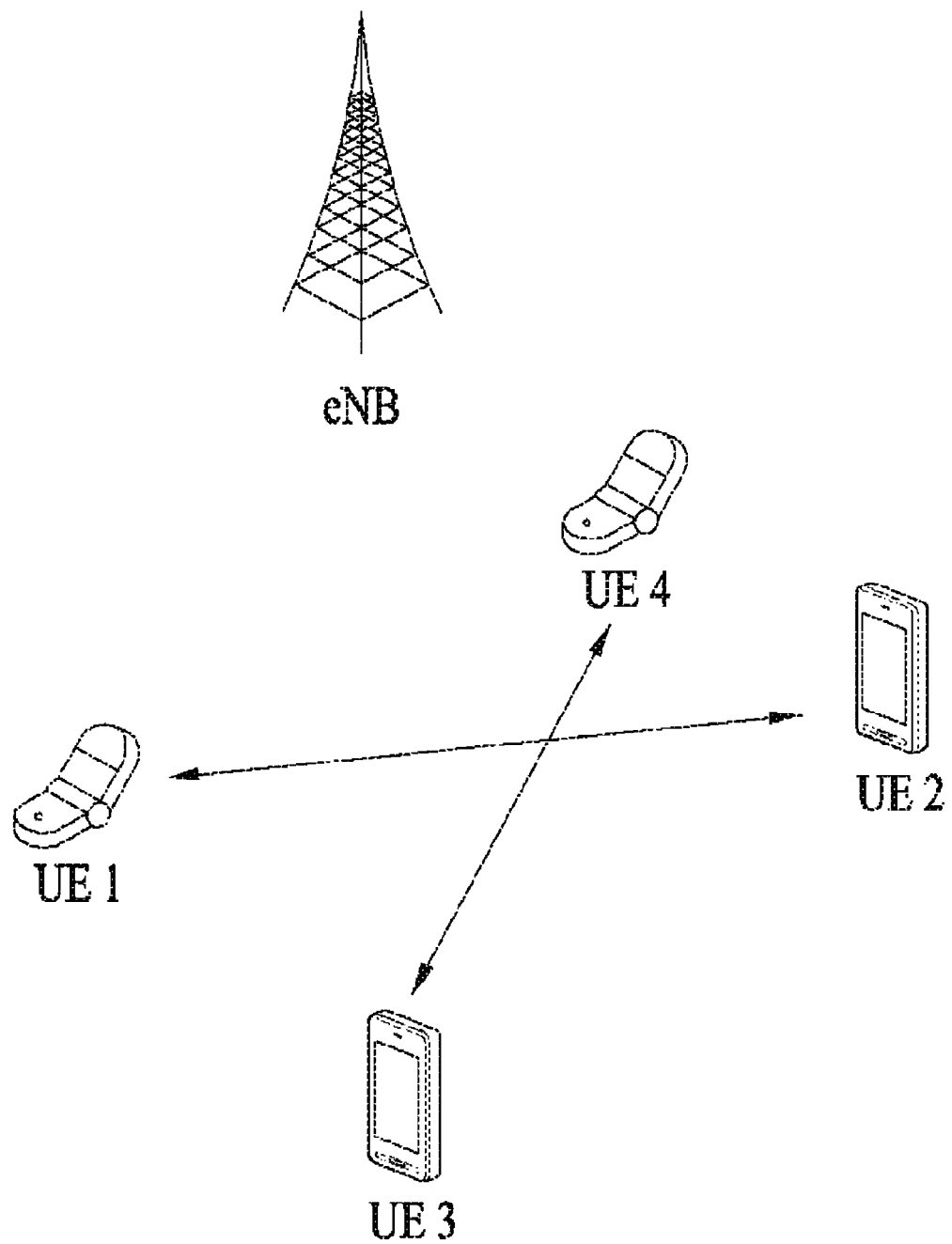
FIG. 8 is a diagram for an example of D2D (device-to-device) communication.

FIG. 8 is a diagram for an example of D2D (device-to-device) communication. D2D corresponds to a technology enabling a direct message to be transceived between UEs without passing through a network (e.g., base station). Referring to FIG. 8, a UE1 and a UE2 perform D2D communication with each other and a UE3 and a UE4 also perform D2D communication with each other. A base station can control a position of time/frequency resource, transmit power and the like using an appropriate control signal for the D2D communication between UEs. The D2D can be called direct communication between UEs or UE direct communication.

In order to initiate/connect D2D communication, a UE should find out a different UE positioned in the vicinity of the UE. A procedure of finding out the different UE positioned in the vicinity of the UE is called a discovery procedure. The discovery procedure can be performed as follows, by which the present invention may be non-limited.

(i) If necessary (e.g., in case of initiating D2D communication), a UE (hereinafter, a discovering D2D UE) can transmit a predetermined radio signal (hereinafter, a discovery signal) to find out a different UE (hereinafter, a discovered D2D UE) positioned in the vicinity of the discovering UE. The discovery signal can include identification information (e.g., UE ID) of the discovering D2D UE.

(ii) Having received the discovery signal, the discovered D2D UE can transmit a response signal to the discovering D2D UE. The response signal may correspond to a discovery signal of the discovered D2D UE. The response signal can include identification information (e.g., UE ID) of the discovered D2D UE.

(iii) The discovering D2D UE and the discovered D2D UE can negotiate/exchange UE capability with each other to establish a direct communication path between the discovering D2D UE and the discovered D2D UE.

The discovery procedure can be performed in a manner of receiving a help from a network or can be performed without the help of the network. If a D2D UE discovers a different D2D UE with which D2D communication is to be performed, it is able to perform a D2D connection establishing procedure. If a D2D connection is established, data can be exchanged through a direct communication path between D2D UEs.

D2D Operation within/Outside of Coverage

Figure 9:
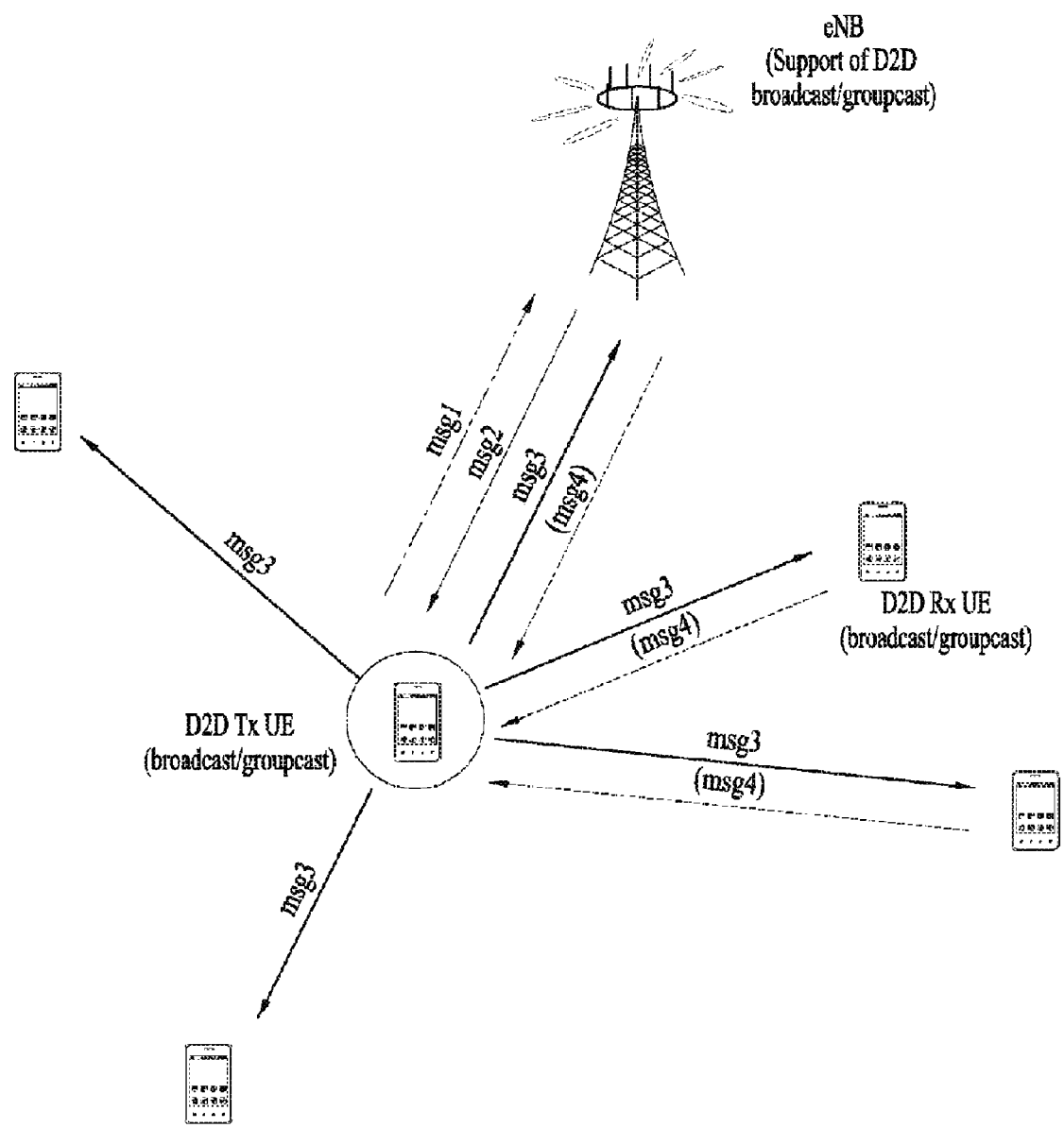
FIG. 9 is a diagram for an example of D2D broadcast/groupcast performed at the inside of coverage.

FIG. 9 is a diagram for an example of D2D broadcast/groupcast performed at the inside of coverage. An msg1, an msg2, an msg3 and an msg4 correspond to messages respectively corresponding to each step described in the following.

Step 1: A signal indicating to attempt to transmit a broadcast/groupcast signal (to be transmitted at the step 3) according to a predetermined rule. This signal can be considered as a scheduling request for transmitting the msg3 in the step 3. The signal mentioned in the step 1 is called an msg1 for clarity. The msg1 is delivered from a D2D UE to a specific base station/network. Other D2D UEs may receive the msg1 (overhearing) depending on a method.

Step 2: A signal of a base station which is transmitted in response to the step 1 (e.g., resource allocation or accept/reject for msg3 transmission). This signal delivers information (e.g., resource allocation, power control, timing advance, a CP length, etc.) necessary for transmitting msg3 broadcast/groupcast signal to a D2D UE of the step 1. The signal mentioned in the step 2 is called an msg2.

Step 3: This step corresponds to a procedure that a D2D Tx UE of the step 1 delivers a broadcast/groupcast signal to a D2D Rx UE and a cluster head (or a base station). In some cases, the signal can be transmitted to a restricted D2D Rx UE (group) only. In some cases, the signal is received by a base station to make the base station perform an appropriate reaction (e.g., relaying or repetitive transmission performed by the base station). The signal mentioned in the step 3 is called an msg3.

Step 4: This step corresponds to an operation for assisting the step 3 and a step of performing a related operation according to whether or not a signal is properly received in the step 3. If the signal is not properly received, a related operation can be performed according to a channel on which the signal is not properly received. In some cases, a base station can broadcast/groupcast the message (msg3) of the step 3 to D2D RX UEs or an Rx UE group at the time instance of step 4. In this case, it can be comprehended as the msg3 is repeatedly transmitted. The signal transmitted in the step 4 is called an msg4.

As an approaching method for implementing D2D at the outside of coverage, a UE cluster is explicitly or implicitly generated and a cluster head may exist. The UE cluster may operate as a base station (e.g., semi- or full-centralized scheduling) and may be able to perform a part of functions of the base station instead of the base station. And, the cluster head can perform very simple coordination.

Figure 10:
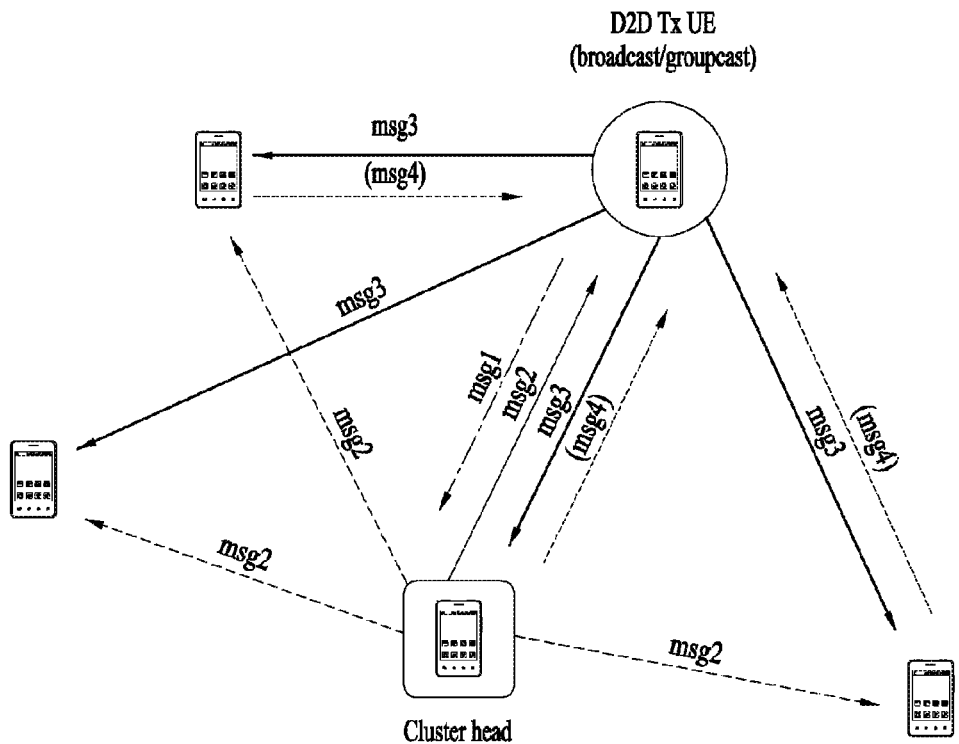
FIG. 10 is a diagram for an example of D2D broadcast/groupcast performed at the outside of coverage.

FIG. 10 is a diagram for an example of D2D broadcast/groupcast performed at the outside of coverage.

Referring to FIG. 10, a UE including a broadcast message is called a D2D broadcast/groupcast Tx UE (simply called, a Tx UE) and a UE receiving the broadcast message is called a D2D broadcast/groupcast Rx UE (simply called, an Rx UE). The Tx UE transmits an msg1, which plays a role of requesting broadcast scheduling, to a cluster head taking a charge of managing/coordinating a resource to receive a resource of which time, frequency, sequence (code) and the like for delivering the broadcast message are configured independently or being combined. The msg1 may be able to use a form identical or similar to a form of a RACH preamble.

Figure 11:
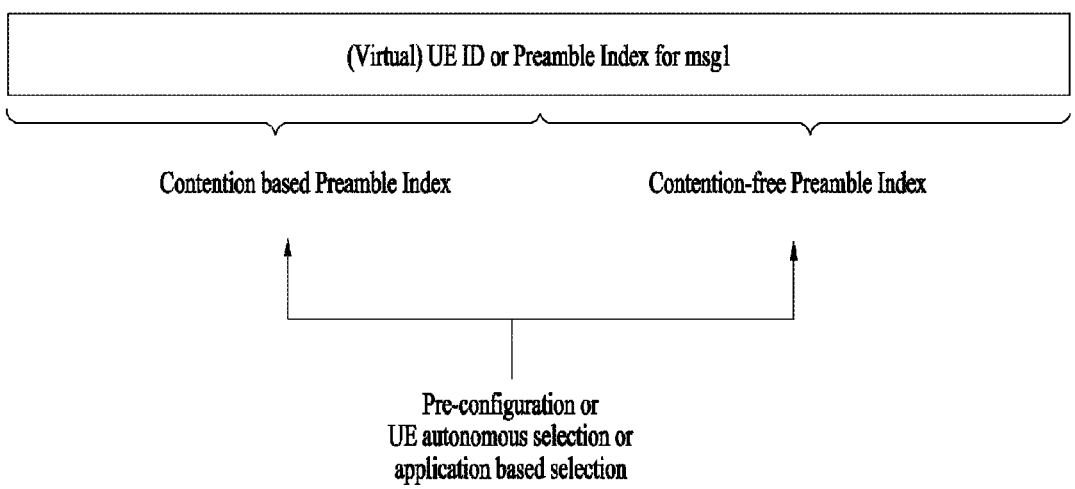
FIG. 11 is a diagram for an example of classifying resources used for a message (e.g., msg1) for requesting resource allocation to transmit a D2D signal.

FIG. 11 is a diagram for an example of classifying resources used for a message (e.g., msg1) for requesting resource allocation to transmit a D2D signal.

If there are P numbers of preamble sequences, a part of the P number of preamble sequences is used for contention-based preamble transmission and the rest of the P number of preamble sequences can be used for non-contention-based preamble transmission. According to the contention-based preamble transmission, a preamble (sequence index) resource to be transmitted is randomly selected from a determined preamble (sequence index) set. On the contrary, according to the non-contention-based preamble transmission, a preamble (sequence index) resource can be designated/allocated in advance or it may be able to design a UE to explicitly or implicitly know a resource according to a resource region (e.g., t_id, f_id) transmitted by the UE, a UE ID, a UE group (ID), UE priority (index), and the like. For example, if an msg1 is transmitted to a specific resource region, a preamble (sequence) index can be determined according to a position of the resource region. It may also be able to make a UE freely select and use the non-contention-based preamble transmission and the contention-based preamble transmission. Or, selection of the preamble transmission scheme can be configured in advance according to a UE application. As an example, when a UE performs an emergency call, it may be able to configure or fix the UE to attempt transmission using a contention-free resource. Or, if a resource is differently allocated according to a cluster group, it may be able to minimize collision.

Figure 12:
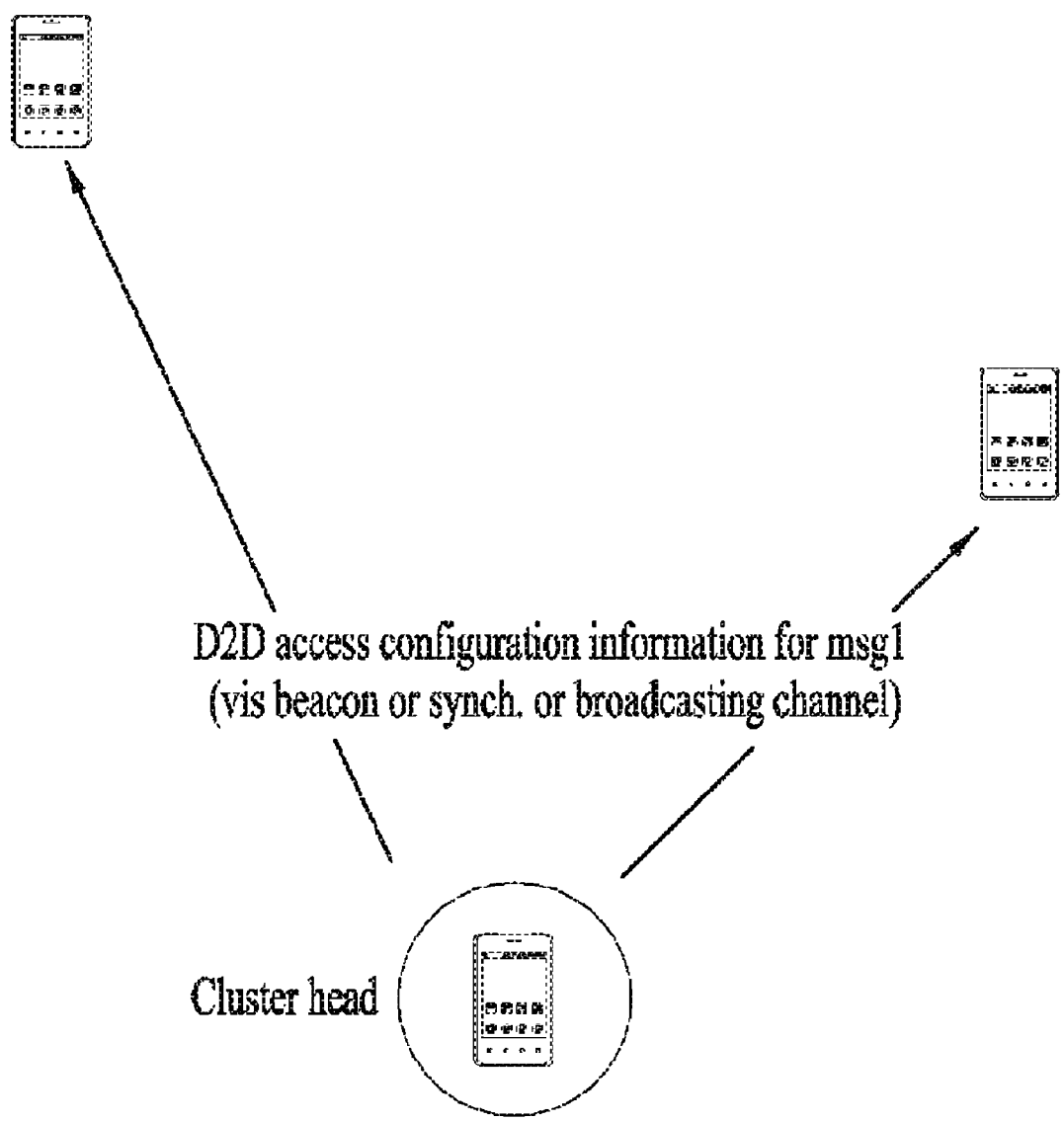
FIG. 12 is a diagram for an example of transmitting D2D access configuration information for an msg1.

Meanwhile, the msg1 can be transmitted using predetermined timing and a resource (LTE RACH access slot pre-configuration, i.e., similar to PRACH configuration), can be transmitted using timing determined based on a UE-specific attribute (e.g., ID) and a resource and can be transmitted based on information broadcasted by a cluster head with periodicity. For example, if an Rx UE detects a specific cluster head and intends to operate in a group to which the cluster head belongs thereto, the Rx UE is able to know a resource to be broadcasted by a Tx UE in a manner of monitoring broadcast information of the cluster head. For example, as shown in FIG. 12, a cluster head can transmit D2D access configuration information for an msg1 via a beacon, a synchronization channel or a broadcast channel. This may be similar to a pre-procedure that a PRACH configuration is received before a PRACH preamble is transmitted. Meanwhile, there may exist a method of making all D2D UEs have configuration information in which msg1, msg2, msg 3 and msg4 timing information are included in advance. The method can be implemented by OAM (operation and management), a broadcast signal or the like.

Having received the msg1, a cluster head determines or schedules timing of broadcasting an msg3 broadcasted by a Tx UE and informs the Tx UE of information on the timing using the msg2. The information can be identified by broadcasted broadcast slot configuration information. Meanwhile, in order to listen to the msg3 or in order for an Rx UE to listen to the msg3, it is necessary for the Rx UE to listen to the msg2 as well. It is necessary to inform all UEs within a D2D broadcast range or all Rx UEs entering the broadcast range of transmission timing of the msg2 to enable all UEs or all Rx UEs to receive the msg2. In particular, if it is able to know a fact that the msg1 is transmitted by a Tx UE, it is able to identify the msg2 transmission timing. For example, it is able to configure the msg2 to be transmitted in an N_msg1 subframe after the msg1 is transmitted. As a different example, an msg2 transmission timing candidate is determined and an RX UE should always monitor the msg2 at the determined time (e.g., subframe). If a specific PDCCH is detected, the Rx UE can immediately decode the specific PDCCH. For example, a subframe #0 of every radio frame, a subframe #0 of an even number radio frame or a subframe #0 of an add number radio frame can be signaled as the msg2 transmission timing candidate in advance by D2D configuration information. It is able to configure or fix msg2 transmission timing (e.g., a specific subframe, a subframe set or a subframe(s) including periodicity) in advance with a specific value. Or, the msg2 transmission timing may change through an OAM procedure. If a UE(s) belongs to coverage of a base station, the msg2 transmission timing can be modified in a manner that configuration information is downloaded to the UE(s) and stored in the UE(s). The msg2 transmission timing can be determined in a manner that a cluster head and UEs belonging to a group transceive a negotiation signal with each other in a distributed from. Or, the msg2 transmission timing can be determined together while a synchronization signal of a cluster head is received. In this case, it is able to obtain D2D configuration information via information on a message associated with a characteristic (e.g., a type, an index, etc.) of the synchronization signal, information on a message delivered together with the synchronization signal or information on a message delivered after the synchronization signal. A synchronization signal used in D2D communication may correspond to a synchronization signal or a synchronization channel which is defined irrespective of a legacy PSS/SSS. D2D UEs receive a synchronization signal/channel from a cluster head or a different UE and may be then able to match synchronization with a different UE(s) participating in D2D communication.

The msg2 includes scheduling information necessary for broadcasting the msg3. As an example of the scheduling information, there is a temporary ID, power control information, timing information, CP (cyclic prefix) information and the like. Having received the msg2, a Tx UE and an Rx UE are able to know timing of transmitting the msg3, a resource (e.g., a transmission subframe) to which the msg3 is transmitted and timing or a resource (a monitoring subframe or a reception subframe) used for listening to the msg3.

An msg2 can be used for the usage of scheduling a plurality of following msg3. The present invention proposes a method of implementing a form of transmitting a plurality of msg3 scheduling authentications at a time similar to a random access response (RAR) message configuration scheme. This method corresponds to a method of receiving scheduling commands for a plurality of msg3 at the same time in a manner of transmitting an msg2 message once instead of individually transmitting the msg2 message whenever scheduling necessary for transmitting an msg3 to be used later is necessary.

A Tx UE transmits the msg3 using a designated parameter (time, frequency, power and the like). The msg3 can be generated using a predetermined D2D (broadcast) temporary ID. For example, the msg3 can be scrambled using a temporary C-RNTI of LTE system and/or IMSI (international mobile scriber identity). The msg3 can include a UE ID to resolve collision with a different broadcast Tx UE. The UE ID may correspond to an ID separately generated for the use of D2D.

Long-Length Sequence for Reducing Collision Probability

A method of reducing probability of collision using types of a sequence greater than types of a legacy RACH preamble may correspond one of methods of resolving collision. A CAZAC sequence series, a CAZAC sequence on which a UE ID is embedded, or a Zadoff-chu sequence can be used as a long-length sequence. Although such a problem as ID overlapping and the like may occur, if such a process as hashing for mapping a plurality of UE IDs to a single new ID is applied to a UE ID, it may obtain a virtual ID or a hashing ID of which a length is somewhat reduced. Or, it may be able to perform contention resolution using a CAZAC sequence or a Zadoff-chu sequence, which is generated based on the virtual ID or the hashing ID. If a length of a sequence is getting longer, complexity of a receiver increases. Yet, if a UE ID of a longer sequence is transmitted in a manner of being introduced into a preamble, the number of preamble sequences increases. Hence, an msg1 collision probability, which occurs due to an identical sequence index randomly selected in the msg1 step, is considerably reduced. If a long-length sequence or a preamble based on the long-length sequence is introduced, it is able to considerably reduce collision in the msg1 step before actually broadcasted important messages are collided with each other, i.e., messages are collided with each other in the msg3 step. Hence, it may be able to considerably reduce latency, which occurs due to contention resolution performed in the msg4 step. If a broadcast signal operates based on contention, the reduction of latency may correspond to a more necessary condition especially in case of an emergency broadcast signal.

In a general situation, it may be able to utilize a legacy RACH procedure as much as possible. In particular, in case of performing emergency broadcast, it may use a separate preamble sequence. Or, it may be able to reserve a preamble sequence for the use of emergency as another option. Yet, if a plurality of UEs witness an emergency situation at the same time and a plurality of the UEs attempt to perform emergency broadcast at the same time, i.e., in case of attempting to transmit the msg1, it is unable to avoid a collision problem due to a limitation of the number of reserved sequences.

Figure 13:
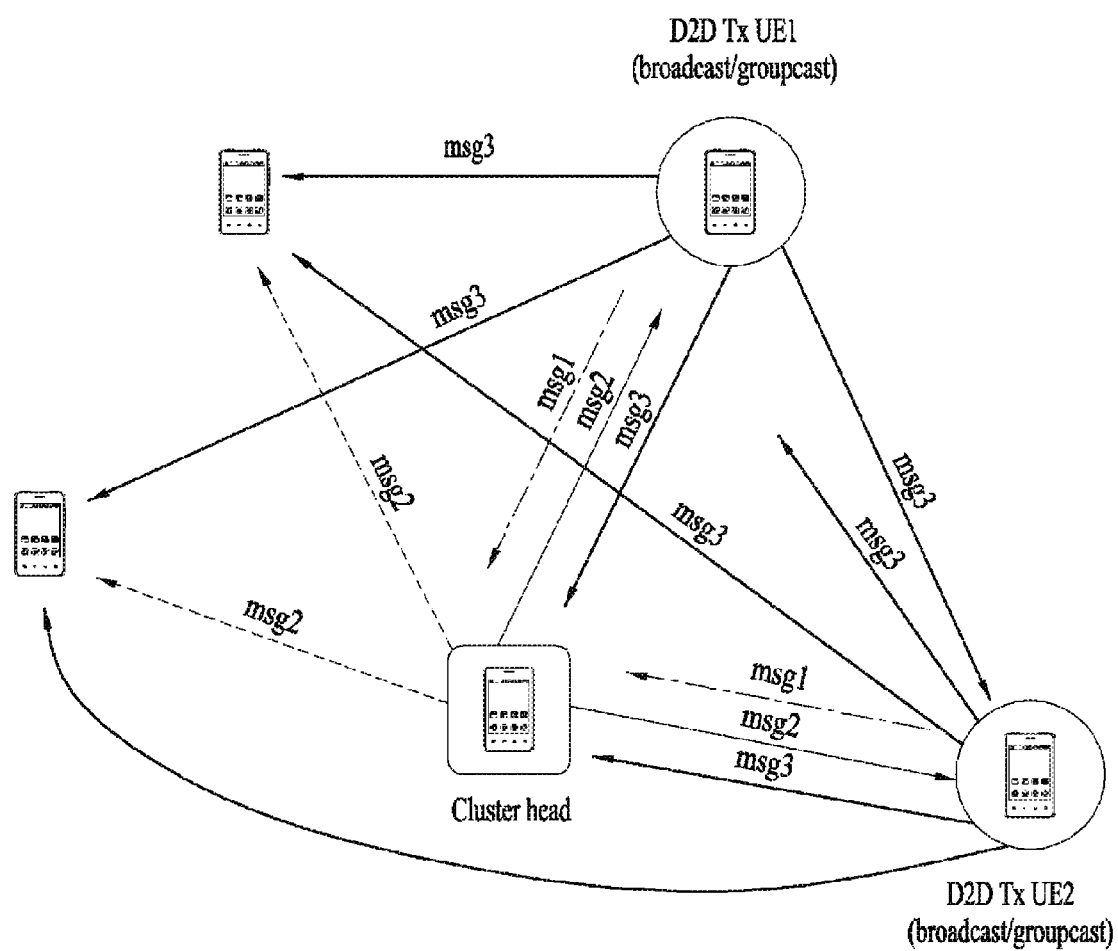
FIGS. 13 to 14 are diagrams for an example of a collision situation due to attempts of broadcasting attempted by a plurality of terminals at the same time.
Figure 14:
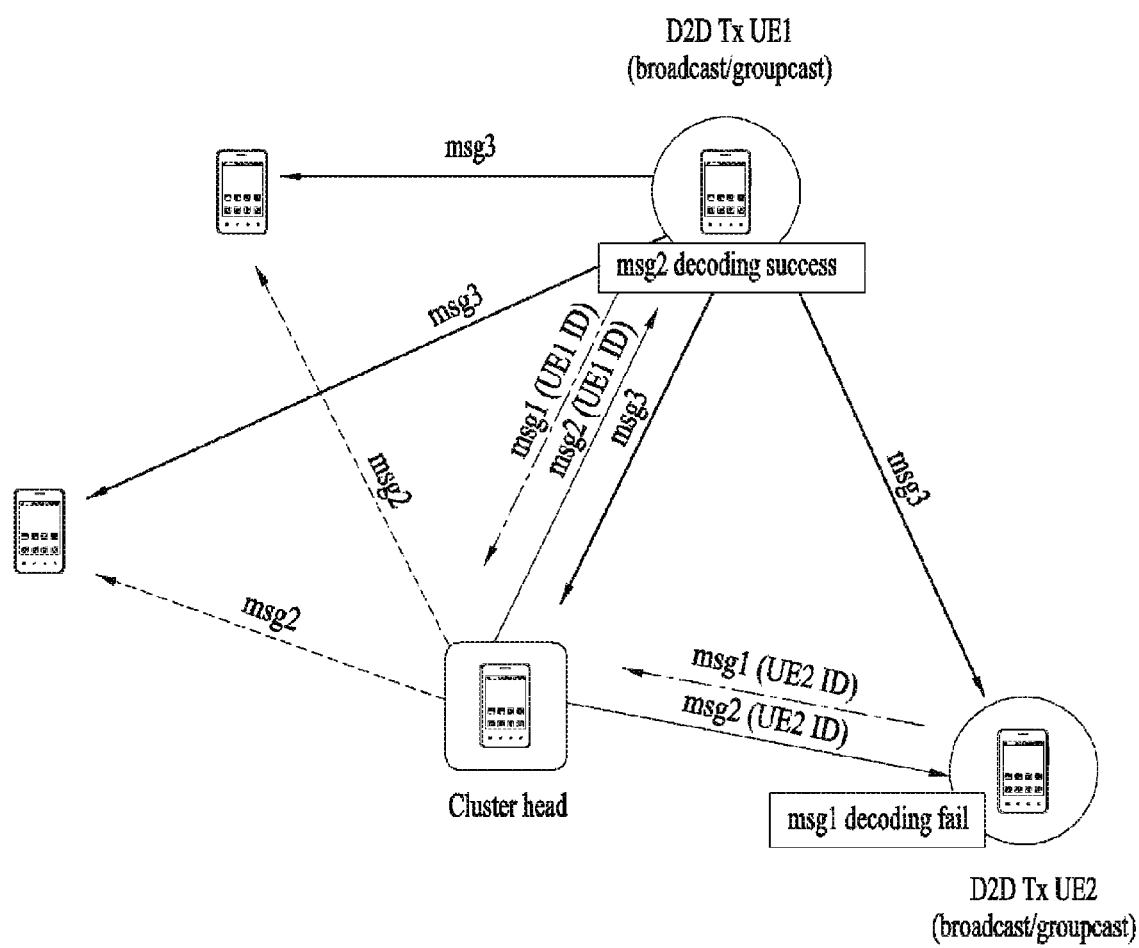

Avoiding Collision Situation in a Manner of Depending on Cluster Head Scheduling FIGS. 13 to 14 are diagrams for explaining a situation that a collision occurs when two or more UEs attempt broadcast at the same time.

FIG. 13 shows a situation that a collision occurs between msg3 when a UE1 and a UE2 attempt D2D broadcast at the same time. When a plurality of UEs (e.g., UE1 and UE2) transmit the msg1, a cluster head may be able to select a UE from a plurality of the UEs. As a different method, if a UE selects importance and transmits the importance to a cluster head, the cluster head can determine priority based on the importance transmitted by the UE. Yet, if a plurality of UEs configures highest importance and transmit the importance, a difficulty of selecting priority may occur again. Hence, when a broadcast message transmission request is received from a plurality of UEs, it is necessary to have a method of handling the broadcast message transmission request irrespective of importance of the broadcast message transmission request. A most intuitive method is to provide information on fairness between UEs. For example, it may be able to lower priority of a frequently request UE and raise priority of a less requested UE. It may have a sort of a priority counter and may be able to consistently count a requesting action of a UE and reset the count.

A different consideration factor is to give a favor to a UE, which has failed after a broadcast message is requested, compared to a different UE in a manner of advancing retry timing of the UE. This method increases a selection probability by increasing the number of attempts in terms of time. This method can also be managed using a separate counter. Referring to FIG. 14, under an assumption that a UE1 and a UE2 transmit a UE ID-based msg1 at the same time and the UE1 is selected, if the UE2 recognizes whether a collision occurs in the msg2 reception step, it is able to avoid a situation that the UE1 and the UE2 transmit msg3 at the same time.

Avoiding Collision Situation in a Manner of Becoming Cluster

It is necessary to implement a function of transmitting a message designated in advance when a specific button of a UE is pushed only in an emergency situation. Yet, in a situation that a cluster head performs contention-based scheduling, it may not guarantee 100% transmission of an emergency call. Although it is able to configure contention not to be performed within coverage, it is difficult to prevent contention between UEs from being occurred at the outside of the coverage since there is no base station at the outside of the coverage. Although a cluster head performs a part of a scheduling function of a base station, since the function of the cluster head is restricted compared to the function of the base station, it is not easy to prevent contention between UEs from being occurred. The present invention proposes a method of increasing broadcast probability in a manner that a Tx UE itself becomes a cluster header and schedules the cluster header as a method of increasing transmission probability of an emergency call by lowering a decision between UEs. Yet, if a cluster head is determined based on contention, the method has a limitation. Hence, in addition to the contention-based method, it is necessary to have a method of making a UE intending to be a cluster head immediately become a cluster head. As a method of the aforementioned method, a UE intending to be a cluster head broadcasts information indicating that the UE wants to be a cluster head or the UE should be a cluster head. For example, if a Tx UE intending to be a cluster head broadcasts a cluster head decision/negotiation signal in a beacon form to indicate that the Tx UE wants to be the cluster head, it may restrict not only a different cluster head but also other Rx UEs to be a cluster head and the Tx UE itself may become the cluster head. If a beacon signal is implemented in a sequence form, a specific sequence(s) can be reserved for the same purpose. The cluster head decision/negotiation signal can include a priority indicator and/or an emergency situation indicator (FIG. 15 (b)). If a plurality of UEs declares to be a cluster head at the same time, a problem may occur. Yet, if there is almost no possibility that a plurality of UEs declare to be a cluster head at the same time, the aforementioned method is helpful.

Figure 15:
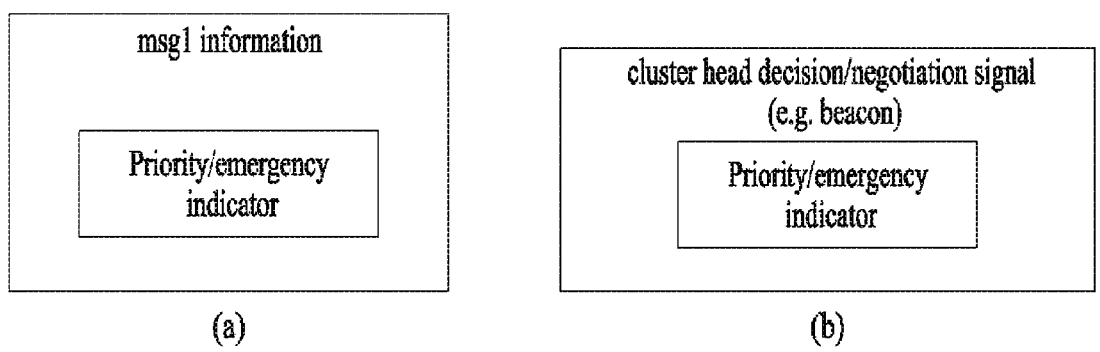
FIG. 15 is a diagram for an example of transmitting a priority indicator and/or an emergency indicator.
Figure 16:
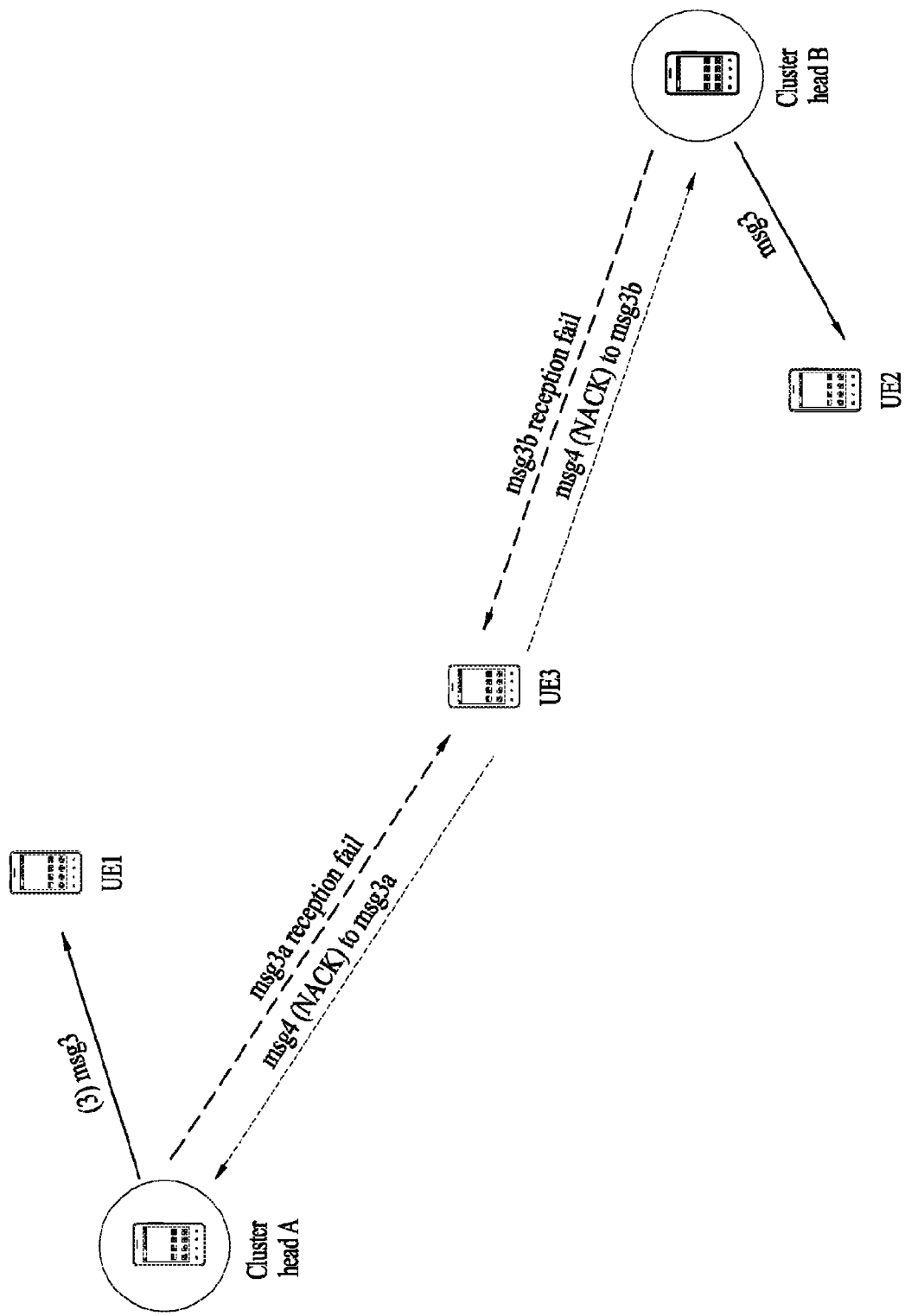
FIG. 16 is a diagram for explaining an example of utilizing an msg4 to receive a plurality of msg3 messages.

And, the msg1 can carry a priority indicator and/or an emergency indicator (FIG. 15 (a)). When a Tx UE transmits the msg1, information for indicating a highest priority is transmitted in a manner of being included in the msg1. If a collision occurs in this procedure and a cluster head is unable to select the information, information indicating that the Tx UE is intending to be a cluster and the information indicating the highest priority can be transmitted in a manner of being included in the msg1. If the msg1 is implemented based on a UE ID, it may be able to obtain a better effect.

Meanwhile, a cluster head informs a UE of a priority counting value or an approximate value of the priority counting value and may be able to induce the UE itself to perform a different operation.

The present method is different from D2D broadcast/ groupcast scheduled by a different cluster head in the aspect that a Tx UE itself intending to perform D2D broadcast/ groupcast becomes a cluster head and immediately starts transmission. Although a cluster head already exists in a cluster to which the Tx UE belongs, the Tx UE itself may become a cluster head. Although a cluster, which is managed by the Tx UE becoming the cluster, may correspond to a new broadcast cluster different from a cluster configured by a legacy cluster head, the cluster can bring a role of the legacy cluster head as it is. In the latter case, it may indicate a situation that a cluster head of a specific cluster has changed. According to the present embodiment, a broadcast Tx UE spontaneously and additionally performs a role of a cluster head or deprives a different cluster head of a position and neutralize a role of the different cluster head. If an emergency UE itself becomes a cluster head according to the present embodiment and performs transmission, a transmission efficiency may increase compared to a case that a UE itself is unable to be a cluster head. If an emergency UE itself is unable to be a cluster head, although a UE, which has nothing to transmit, maintains a position of a cluster head and performs a role of coordinating a collision between the cluster head and the emergency UE.

Embodiments of the present invention regarding a relation among a UE itself becoming a cluster head, a cluster (hereinafter, a broadcast cluster) managed by the UE and a legacy cluster are explained in more detail. The legacy cluster can be maintained or disappeared, a position of the legacy cluster head can be maintained/neutralized, a new broadcast cluster can be generated according to one of a method (1) and a method (2) described in the following.

(1) Generating a New Broadcast Cluster Instead of a Legacy General Cluster

If a broadcast UE itself becomes a cluster head, a new cluster is generated and a legacy cluster head near the UE is disappeared. Since the new cluster head becomes a part of a legacy cluster and a part of a new cluster, it can be comprehended as the legacy cluster is partly absorbed into the new cluster. In order to make a broadcast Tx UE always win in cluster head competition, it is necessary to always make a condition beneficial for the Tx UE to be a cluster head. The condition can be made in various methods. One of the methods is to transceive information indicating that priority of the Tx UE is higher when cluster head negotiation is performed. By doing so, it is able to enhance a probability that the Tx UE intending to perform broadcasting becomes a cluster head. In this case, if a purpose of becoming a cluster head is to transmit a broadcast signal, the msg1 and the msg2 procedure may be not necessary. This is because, in case of transmitting an emergency message, the Tx UE may be able to become a cluster head at any time, directly schedule a broadcast signal and broadcast the signal. Yet, in a collision situation that a plurality of Tx UEs intending to be a cluster head exist at the same time, it is necessary to have an additional method. When a plurality of Tx UEs intends to be cluster head at the same time, it is necessary to perform negotiation again among the TX UEs intending to be a cluster head and a cluster head is determined on the basis of mutual priority. For example, if a priority level of a Tx UE1 predetermined in an application of the Tx UE1 corresponds to 2 and a priority level of a Tx UE2 predetermined in an application of the Tx UE2 corresponds to 4, the Tx UE 1 may become a cluster head in a manner of exchanging mutual priority level in a negotiation procedure. In this case, the priority level can be configured as a level not changeable by a Tx UE to prevent the priority level from being intentionally changed by the Tx UE. In the foregoing description, an application including a priority level is explained as an example. For example, if such a number as '911' is inputted or an emergency call button is pushed, a priority level related to the number or the button can be delivered in the negotiation procedure. It may be preferable to introduce the aforementioned priority level to an application for public disaster or a broadcast signal for public disaster only.

In the proposed method, it may be able to consider a combination that a broadcast cluster corresponds to a new cluster including a scheduling function only and information such as timing reference is received from a legacy normal cluster. For example, in order to temporarily secure a scheduling function only to transmit a broadcast signal, a Tx UE can transmit a broadcast message in a manner that the Tx UE intentionally makes a broadcast cluster and the Tx UE itself becomes a cluster head. In this case, synchronization reference can make legacy normal reference to be maintained. By doing so, a burden of matching synchronization, which is resulted from a suddenly generated and disappeared broadcast cluster, matched again by cluster UEs can be reduced.

(2) Generating a New Broadcast Cluster on the Top of a Legacy Normal Cluster

A broadcast cluster is generated in an overlay form by a broadcast cluster head of a dimension different from a dimension of a legacy cluster head and it may be able to form a layered cluster. Such a broadcast message as an emergency signal and the like can be directly transmitted by a cluster in the aforementioned formed broadcast cluster. In this case, such a special purpose as emergency broadcasting and the like can be achieved only when the broadcast cluster has top priority. Hence, it may be preferable to position authority of the broadcast cluster at the top of authority of the legacy cluster head. Information indicating that "a new cluster is to be generated" or "a new cluster is generated" and, if necessary, information on "on/off duration of the newly generated cluster" can be informed in a manner of transmitting a beacon for (emergency) broadcast with (top) high priority at a cluster on/off duration used to be managed by the legacy cluster head. For example, the aforementioned information can be broadcasted via a beacon or can be broadcasted in advance. Or, the information can be preconfigured. Having received the broadcast beacon, a UE should receive a message transmitted by a new cluster head during on-duration instead of on-duration of the legacy cluster.

After a cluster head is determined according to the aforementioned two proposed methods, basic operations performed by the cluster head can be summarized as follows.

1) A cluster head correspond to a random UE.
2) A cluster head configures a prescribed section as a section for which a transmission intention is showed.
3) If a UE has data to transmit, the UE shows intention in a corresponding section and then transmits the data.
4) In the aspect of an Rx UE, if the Rx UE does not discover anything in the section for which the intention is showed, enter off-duration.

Method of Implementing ACK/NACK in Consideration of msg3 Error Case

Msg3 transmission can be implemented in a manner of requesting a response for the msg3 or not requesting a response for the msg3. For example, if groupcast is performed for the purpose of implementing group communication, it may be able to receive a HARQ response in response to a delivered packet. In this case, it is necessary to determine a recipient of the HARQ response and a method of delivering the HARQ response. In case of considering a point to point HARQ, it may be able to transmit a feedback on ACK/NACK to a transmitter. Similar to this, in case of a broadcast signal, it may be able to inform a Tx UE of whether or not reception of the broadcast signal is successful.

If M number of UEs (where M<N or M=N) make responses among N number of UEs, there may exist various methods for making a final decision by combining the responses with each other. The final decision can be simply made by the majority. Or, if NACK is equal to or less than a certain %, it can be considered as a success. If NACK is equal to or greater than the certain %, it may be able to perform such an operation as retransmission attempt and the like. And, a cluster head combines ACK/NACK received from a plurality of Rx UEs with each other and may be then able to deliver a final decision value to a Tx UE. In this case, if the Tx UE delivers an identical packet to a plurality of group UEs, the aforementioned method is usable. Yet, if the Tx UE delivers packets different from each other to UEs different from each other, it may be preferable to individually manage a HARQ operation according to each link.

In the aforementioned scheme, a UE in an RRC idle mode or a UE in a DRX (discontinuous reception) mode may be unable to listen to a broadcast message. Hence, when a cluster head receives the msg1, it is necessary to wake up the UE in the idle mode to inform the UE of timing of transmitting the msg3. It may also be able to wake up the UE in the idle mode using legacy paging. In this case, latency may exist. Hence, it is necessary to determine the timing of transmitting the msg3 in consideration of the latency. In case of a legacy RACH, if the msg2 is received in a subframe n, the msg3 can be transmitted in a subframe n+k (e.g., k>4 or 5 or 6 . . . ). Yet, according to the present invention, it is necessary to consider time until a state that the UE in the idle mode is able to listen to the msg3. In order to reduce the latency and efficiently manage D2D, new paging of less latency can be introduced for a UE of which D2D is enabled.

Necessity of msg4 for Handling msg3 Collision Case

When it fails to receive the msg3 at the outside of coverage, it is necessary for an Rx UE to make a response for the failure. When the msg3 is transmitted in a manner of being configured by a control part (PDCCH) and a data part (PDSCH), the failure of receiving the msg3 can be classified into a control part (PDCCH/EPDCCH) error case and a data part (PDSCH/PUSCH) error case. In this case, the data part corresponds to a part to which a HARQ operation is applicable. In order to simplify system implementation, it may be able to handle an error case in consideration of the control part error case only. When CRC (cyclic redundancy check) is checked for the control part only, if the CRC is successful, ACK is fed back. Otherwise, NACK can be fed back. For example, the Rx UE performs the CRC check on the control part (PDCCH or EPDCCH), which is masked based on a virtual ID, and can feedback ACK or NACK according to a result of the CRC. A message used for the feedback is called an msg4. In particular, the present embodiment uses the msg4 as alternative information for checking whether or not the msg3 is received. Hence, the msg4 can be used for determining whether or not the data part as well as the msg3 control part is received. Of course, although the control part is properly received, it is unable to guarantee that the data part is properly received. Yet, it is expected to have a similar probability in most cases, a scheme of checking an error based on the control part may be sufficient enough.

If a data part (e.g., PDCH or PUSCH carrying the msg3) is not decoded, an error may occur. In this case, the msg4 can be used for notifying whether or not final decoding is successful. Yet, due to a characteristic of broadcast and groupcast, it may be not necessary to check acquisition of final information. In particular, if whether or not such control information as the control part (PDCCH/EPDCCH) is delivered is checked and then a response is made based on a result of the check, it is able to sufficiently manage broadcast or groupcast.

In the aforementioned control part error checking procedure, it may use a method of delivering control information of a different format instead of the PDCCH/EPDCCH. Moreover, the control part can be configured by a format of a preamble and a control message. Although the format is similar to the PDCCH/EPDCCH, the format is different from the PDCCH/EPDCCH in terms of a basic configuration unit (e.g., an REG (resource element group), a CCE (control channel element), and an eCCE (enhanced CCE)), an aggregation method, and a mapping method.

The msg4 may also be necessary at the outside of a network. At the outside of the network, the msg4 can be used for determining whether or not the aforementioned msg3 is collided. Yet, in case of performing D2D communication at the outside of the network, whether to include a function of checking successful decoding of the msg3 in the msg4 may vary depending on a case. For example, it is able to transmit a signal for indicating whether or not the msg3 is properly detected to the msg4 using the aforementioned virtual ID or an ID identical to the virtual ID. If control information (e.g., information including MCS (modulation and coding scheme), an NDI (new data indicator) and the like) is separately encoded to the msg3, it is also able to encode the msg3 in a manner of inserting a TX UE ID to the msg3.

For reference, since there exist a plurality of receivers receiving the msg3 at the outside of a network, a meaning of msg3 collision may be different from a legacy meaning. For example, when UEs are positioned in an order of a UE1, a UE2, a UE3, a UE4, and a UE5, if the UE1 and the UE5 transmit the msg3 at the same time in an identical resource, each of the UE2 and the UE4 succeeds in receiving the msg3 from a close UE, respectively. On the contrary, a situation that the UE3 fails to receive the msg3 from both sides may occur.

FIG. 15 is a diagram for explaining an example of utilizing msg4 to receive a plurality of msg3 messages.

Referring to FIG. 15, when a plurality of Tx UEs perform broadcasting and a plurality of Rx UEs receive a broadcasted signal(s), since msg3 are transmitted from two Tx UEs at the same time, a UE3 receives the msg3 twice. Consequently, a situation that the UE3 is unable to properly receive the msg3 may occur. In this case, if it is assumed that the UE3 recognizes the existence of a cluster A and a cluster B, the UE3 may be able to report NACK to both the cluster A and the cluster B in a manner of transmitting an msg4. In the aforementioned example, assume that the UE 3 is able to identify a collision situation resulted from the msg3, which are transmitted at the same time at the timing on which msg3 reception timings are overlapped, in a state that the UE3 precisely knows the reception timings of the msg3 received from both cluster heads. In this case, in order to make a feedback, the msg4 is transmitted in a manner of scrambling NACK using a cluster head UE ID or a virtual ID.

Partial Network Coverage

In the following, a D2D communication scheme is described for a case that a broadcast Tx UE exists at the inside of coverage and a case that the Tx UE exists at the outside of coverage in a partial network coverage situation.

Figure 17:
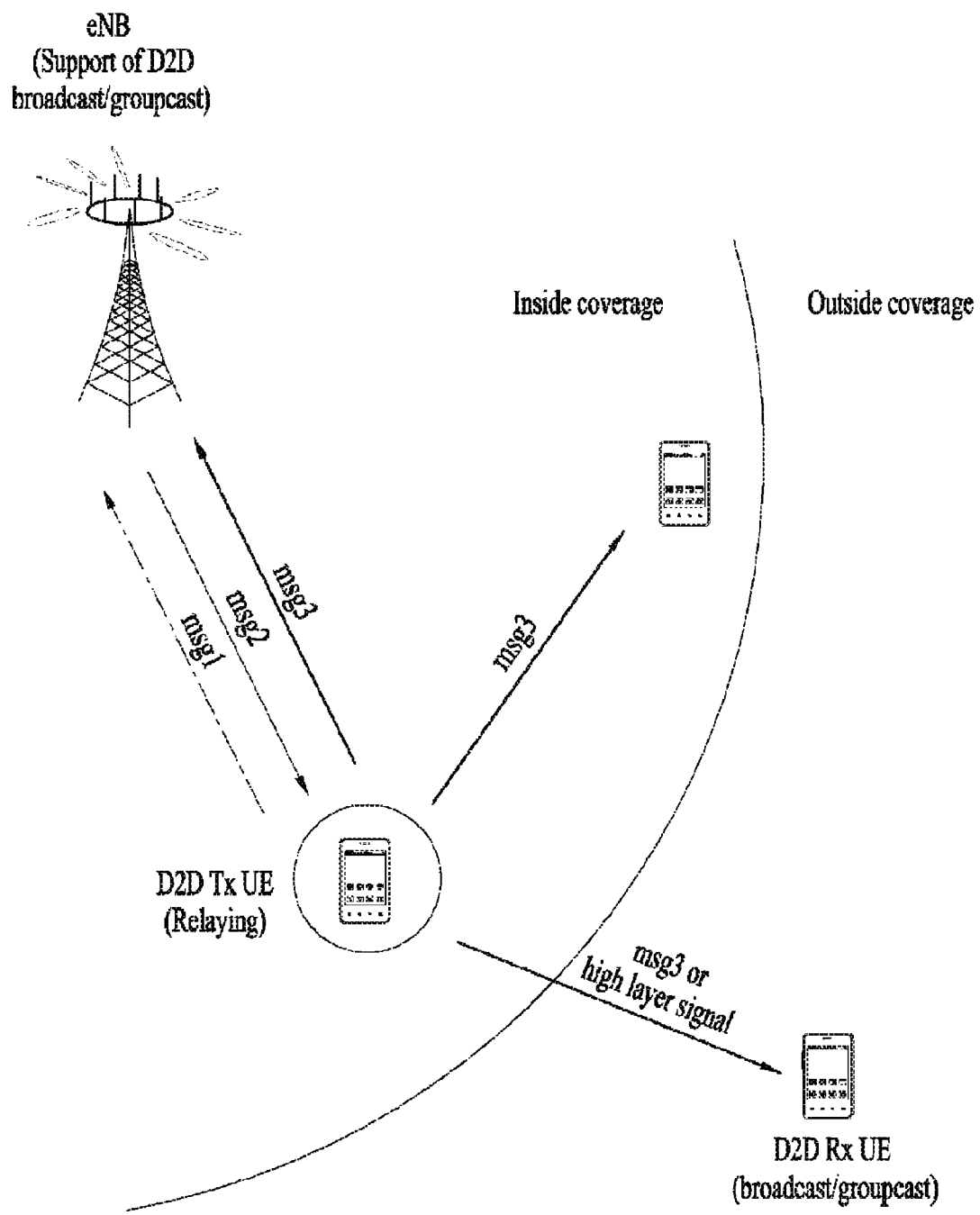
FIGS. 17 to 19 are diagrams for an example of D2D communication under partial network coverage.
Figure 18:
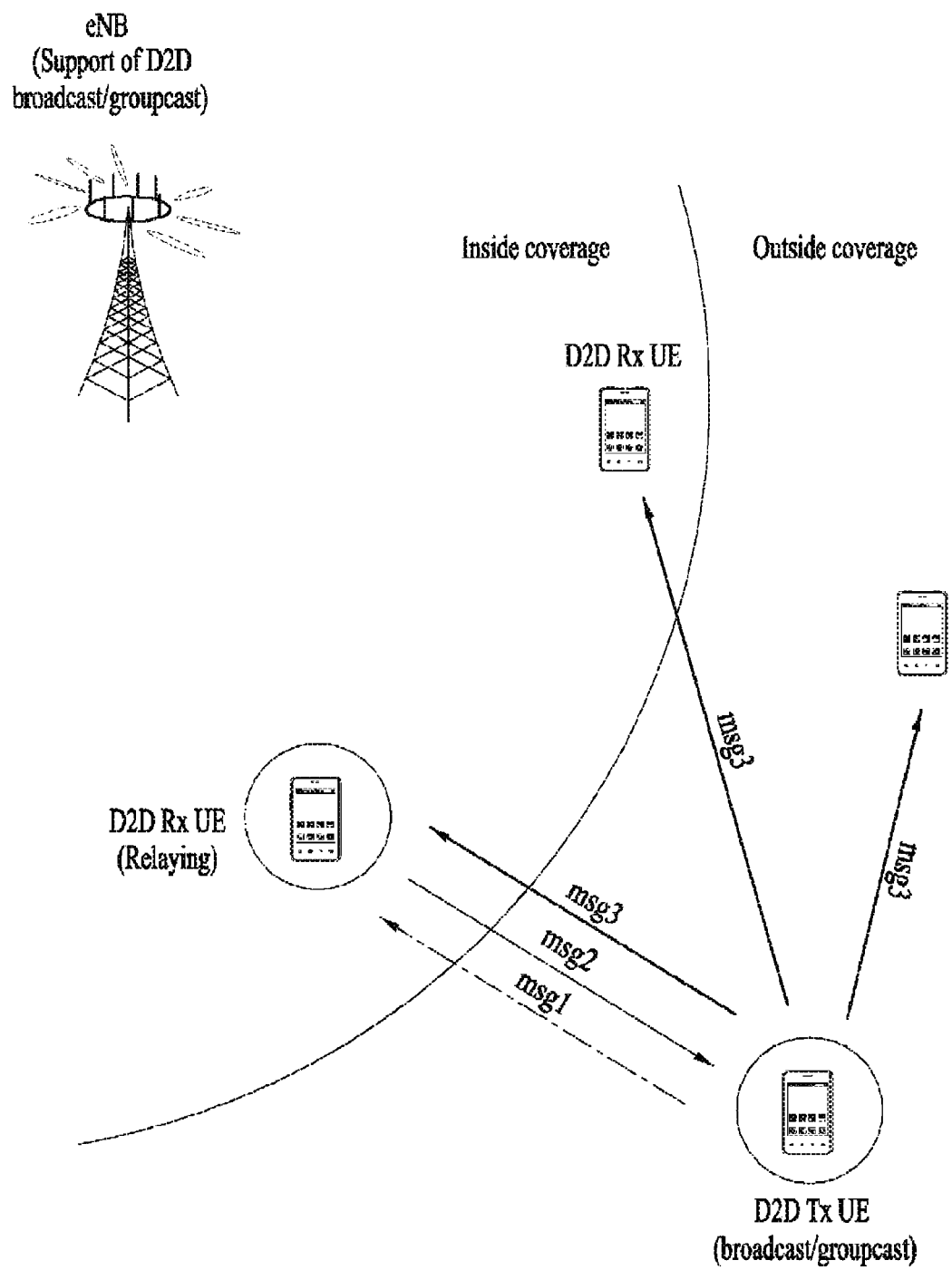
Figure 19:
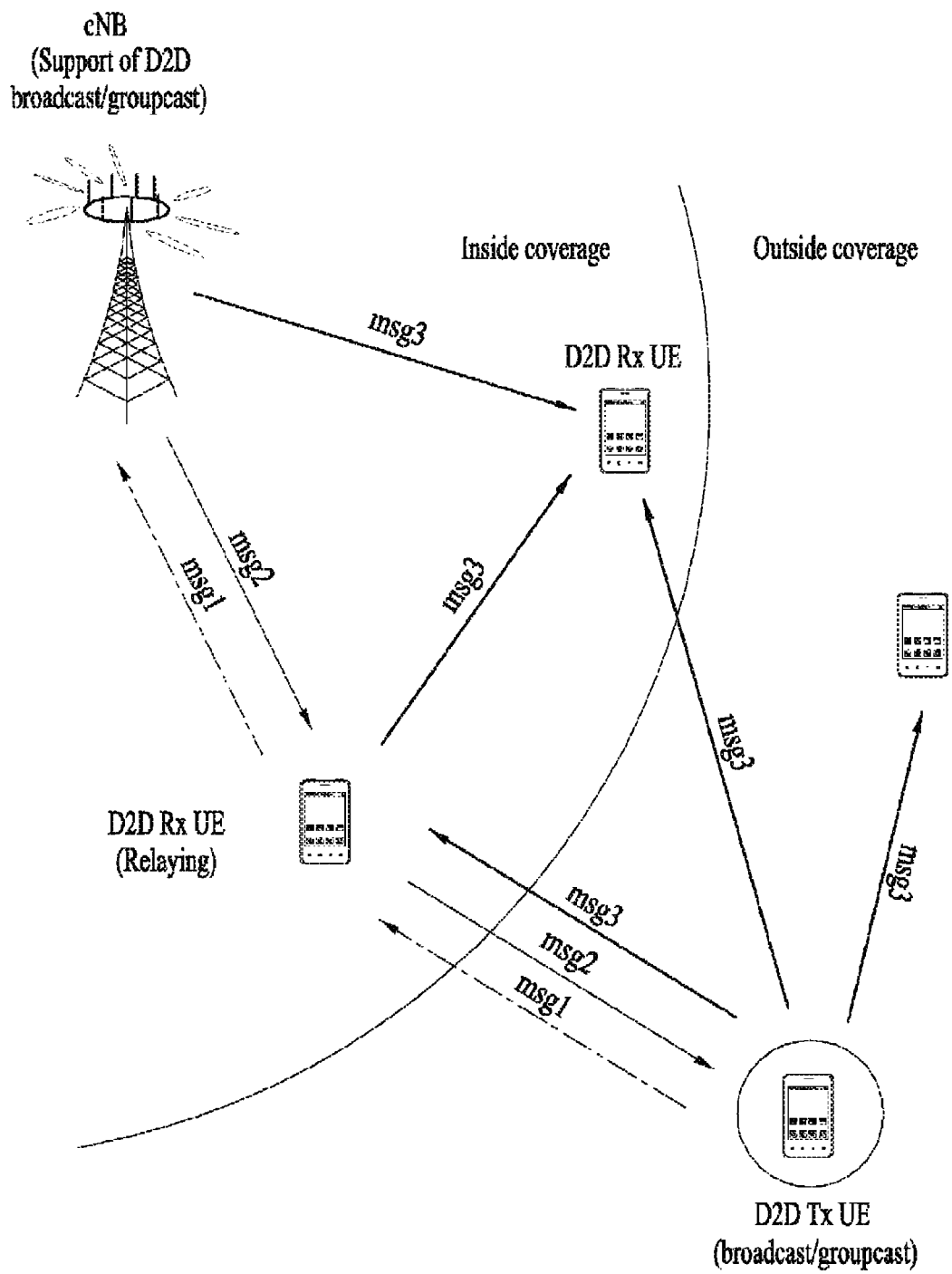

FIGS. 17 to 19 are diagrams for an example of D2D communication under partial network coverage. Specifically, FIG. 17 shows a case that a D2D broadcast UE is positioned at the inside of coverage and FIGS. 18 to 19 shows a case that the D2D broadcast UE is positioned at the outside of coverage.

Referring to FIG. 17, since a D2D broadcast Tx UE, simply, a Tx UE within coverage is connected with a base station, the Tx UE informs the base station of an emergency status of the Tx UE and may be then able to secure a resource capable of transmitting broadcast. For example, the Tx UE can inform the base station of the emergency status using a resource reserved at the time of transmitting the msg1 or a preamble index. The Tx UE can transmit an emergency message without any collision and latency in a manner of receiving a resource via the msg2 and transmitting the msg3.

Referring to FIG. 18, in case of a Tx UE positioned at the outside of coverage, if it is basically assumed that the Tx UE receives a relaying service from a UE positioned at the inside of a network, since synchronization operates based on the network and a requirement is delivered via a relaying node if necessary, it is able to assume that the Tx UE is practically coordinated by a base station. Hence, when a D2D Tx UE is positioned at the outside of coverage in partial network coverage, the D2D Tx UE can deliver a broadcast message in an order of msg1→msg2→msg3 in a manner of being similar to an operation of the D2D Tx UE positioned at the inside of coverage. Yet, since the msg1 is delivered from the Tx UE to the base station via a relaying UE, it may be different from a case that all UEs participating in D2D are positioned at the inside of the network coverage.

Referring to FIG. 19, an msg3, which is initiated by the Tx UE positioned at the outside of coverage, arrives at a relaying UE positioned at the inside of coverage and the relaying UE may be able to play a role in relaying the broadcasted msg3. Moreover, if the msg3 is delivered to a base station, the base station is also able to play a role in relaying the msg3.

Embodiment 1

A concrete method of implementing a UE relaying operation is proposed using the aforementioned step 3 or step 4 D2D broadcast/groupcast procedure (refer to FIG. 9).

Figure 20:
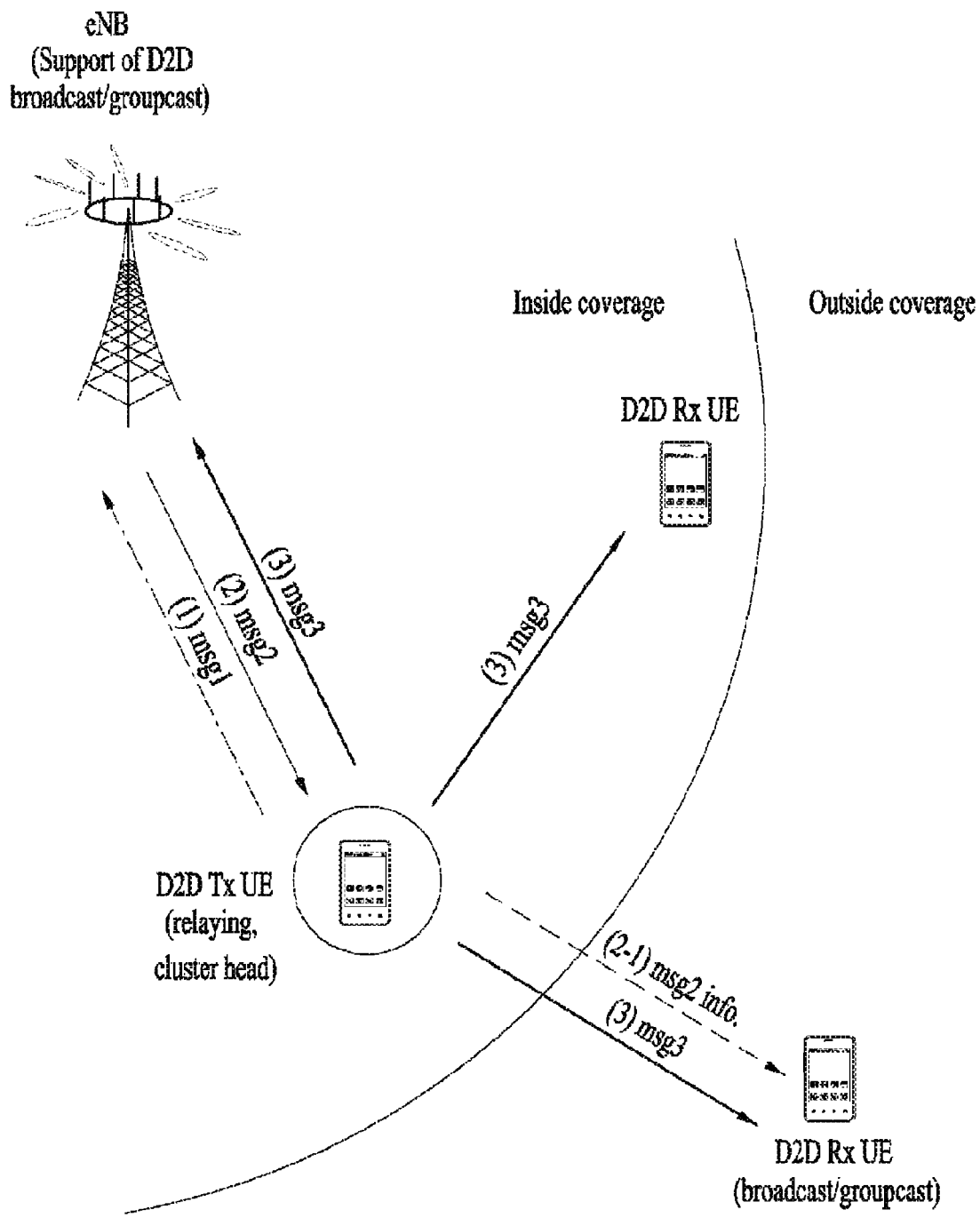
FIG. 20 is a diagram for an example of a D2D operation to perform UE relay.

FIG. 20 shows an example for a procedure that a D2D Tx UE manages a D2D TX UE positioned at the inside of coverage and a D2D Rx UE positioned at the outside of coverage in a manner of binding the D2D Rx UEs with a cluster or a group and performs broadcast or groupcast. Due to a characteristic of a cluster, a message is also delivered to a UE positioned at the outside of coverage. Hence, a Tx UE operates as a broadcasting Tx UE while playing a role of a cluster head. Consequently, it may be able to consider as the Tx UE already performs a relaying operation. Yet, since the UE positioned at the outside of coverage is unable to directly receive an msg2 from a base station, it is difficult for the UE to receive an msg3 at precise timing and successfully perform decoding. In order to solve the problem, the present invention proposes a method for the Tx UE to relay information included in the msg2 to enable the UE positioned at the outside of coverage to receive the information. An important thing is to deliver the msg2 information before the msg3 is broadcasted to decode the msg3 later.

Figure 21:
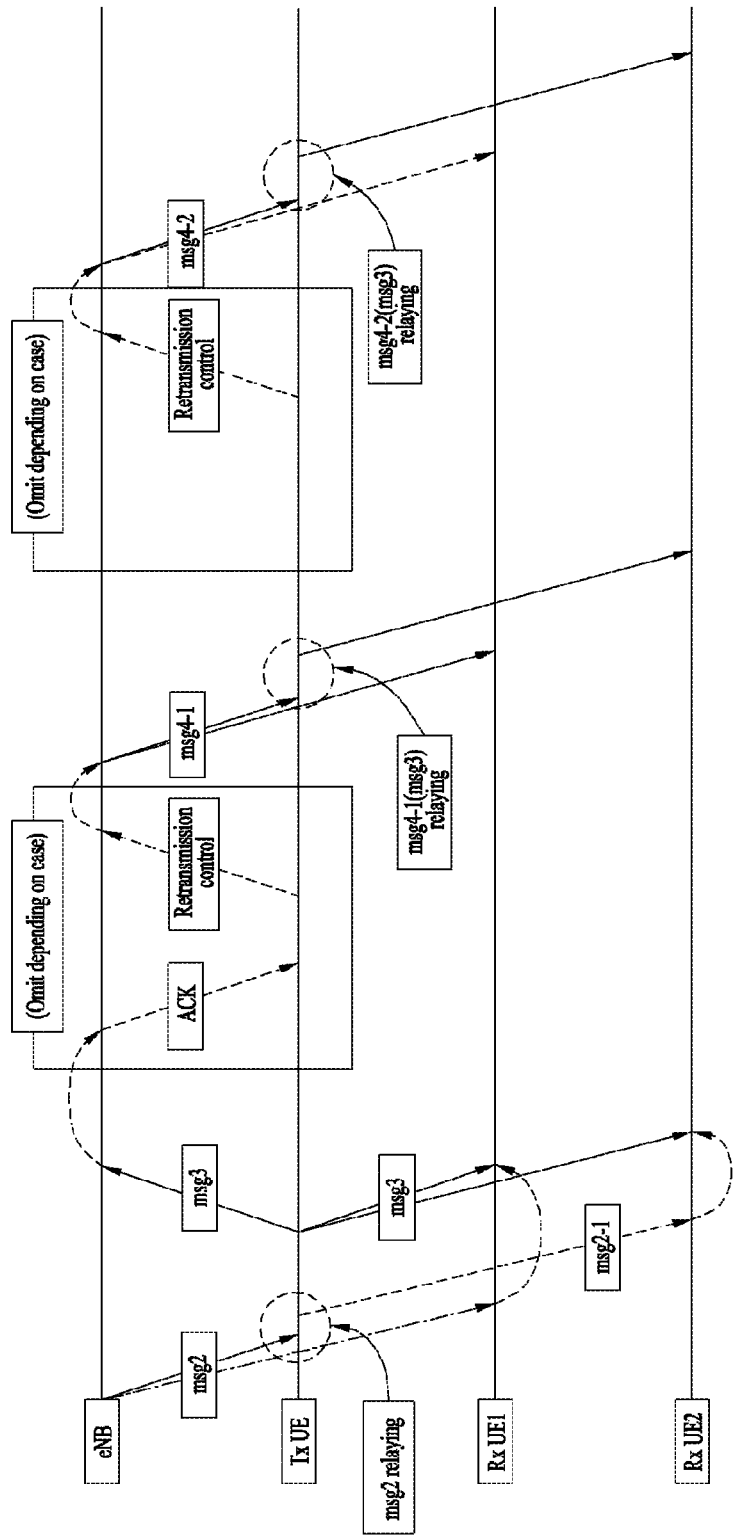
FIGS. 21 to 22 are diagrams for an example of a timing relation of a D2D relaying operation.

FIG. 21 shows an example of a broadcast-based relaying operation. First of all, a Tx UE transmits an msg1 and then receives an msg2 capable of being considered as a scheduling grant or information from a base station. The Tx UE broadcasts and relays the msg3 based on the msg2 information. In order for an Rx UE2 positioned at the outside of coverage to receive the msg3, it is necessary to have advance information related to the msg3. The information can be delivered by a procedure of the base station→the Tx UE→the Rx UE2. The procedure is called relaying. In particular, such an operation as msg2 decoding & delivery is required in the Tx UE to perform relaying. The relaying operation can be performed in various layers including a physical layer, a MAC layer, a link layer, a higher layer and an application layer. Hence, latency may occur while the relaying operation is performed.

The base station receives the msg3 and transmits HARQ AN in response to the msg3. Or, the base station can reply the msg3 as a signal including a response for the msg3. In this case, as shown in an example of FIG. 21, it may be not necessary to have a procedure of delivering the HARQ AN and retransmission control (information). It is able to deliver the retransmission control (information) only. In this case, it is able to indicate N number of retransmissions to be performed by the one time delivery of the retransmission control (information). In this case, it is necessary to notify the number of repetition or the number of repetition can be designated in advance. Or, although there is no retransmission control (information), retransmission can be automatically performed. Moreover, if the number of retransmission is fixed, retransmission can be performed as many as the designated number. Meanwhile, the msg3 reply (i.e., msg4-1) has a meaning of delivering contents of the msg3 as it is. When the contents of the msg3 are delivered, a signal format, MCS, resource allocation, a redundancy version and the like can be differentiated. In this respect, such a word as an msg4-1 or an msg4-2 is used instead of the msg3 retransmission. In case of replying in a form of the HARQ AN, it may be able to reuse a legacy control resource format (e.g., PHICH, PDCCH, and EPDCCH).

An Rx UE capable of receiving an msg4-x corresponds to a UE existing at the inside of coverage. Since it is difficult for an Rx UE positioned at the outside of coverage to directly receive the msg4-x of a base station, it is necessary to relay the msg4-x of the base station. Similar to the msg2 relayed by the Tx UE, it is also able to relay the msg4-1 and the msg4-2. Although it is not an identical handling procedure due to a data difference with control information, it is considered as an identical procedure at this time in the aspect of being relayed. Due to a relaying operation, time delay may occur in the handling procedure.

Figure 22:
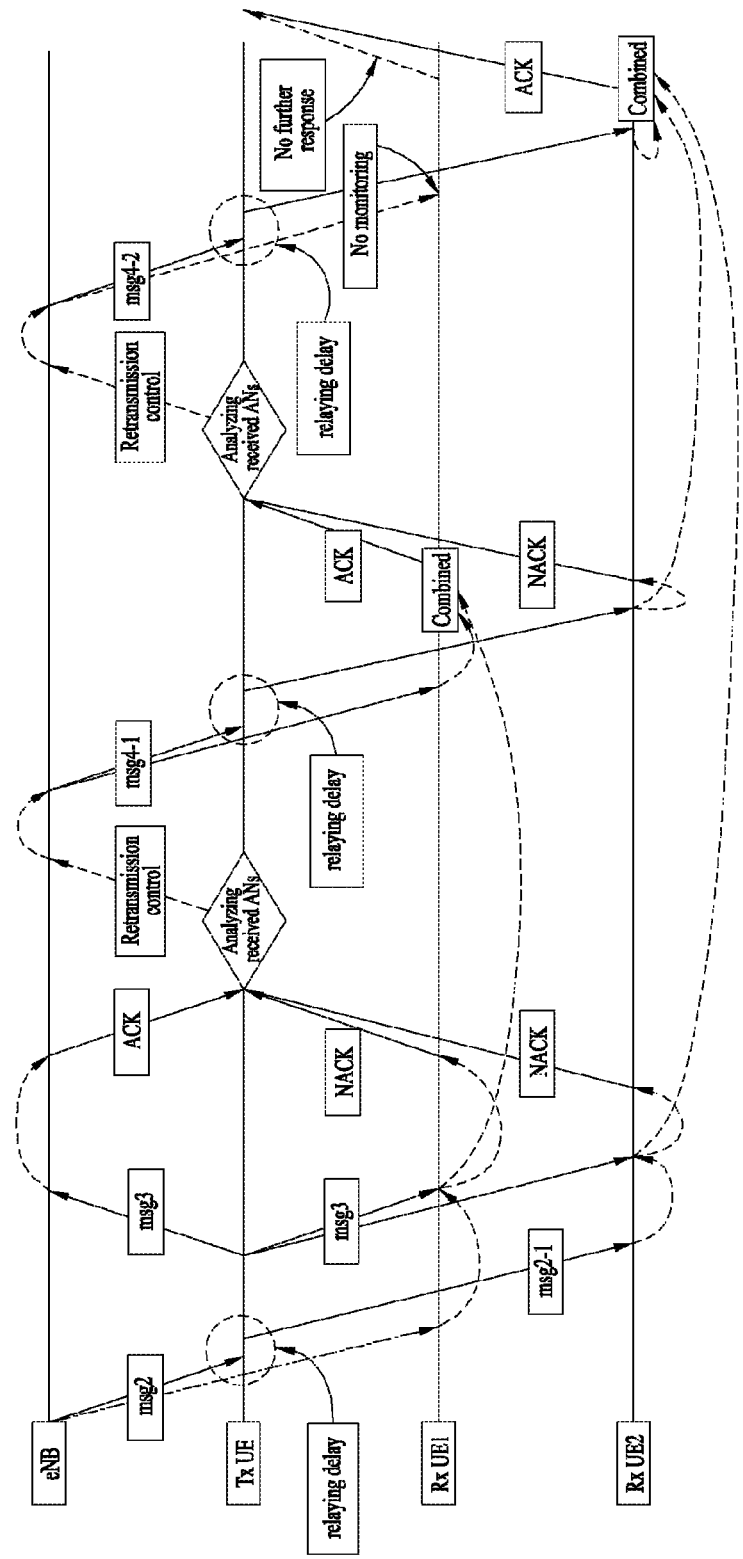

FIG. 22 shows an example for a groupcast-based relaying operation. In this case, it is required to make a HARQ AN feedback in response to msg3 transmission. If a Tx UE transmits an msg3, an Rx UE1 and an Rx UE2 reply HARQ AN in response to the msg3. Similar to this, a base station also replies the HARQ AN in response to the msg3. Yet, this procedure can be omitted depending on an implementation method (e.g., reason for being identical to FIG. 21). In this case, a unique point is, since it is groupcast, to collect HARQ responses received from a plurality of UEs, analyze the HARQ responses, make a decision on the HARQ responses and determine whether to perform retransmission according to the decision. If it is determined to perform retransmission, an msg4-x corresponding to a retransmission version of the msg3 is transmitted to enable all UEs in a group to listen to the msg4-x. In this case, a Tx UE is in charge of the retransmission for a UE positioned at the outside of coverage to which the msg4-1 is not delivered. A broadcasting UE (in this case, a relaying UE) and a cluster/group head may become different from each other. FIG. 22 shows an example that a relaying UE and a cluster head are matched with each other. A relaying UE, i.e., a cluster head shown in the drawing (i.e., a Tx UE) receives the msg-4, reproduces the msg4-x and performs a relaying operation for a UE positioned at the outside of coverage after prescribed time elapses. Of course, such a UE as an Rx UE1, which has successfully completed reception after a first retransmission, does not need to additionally monitor a message.

Figure 23:
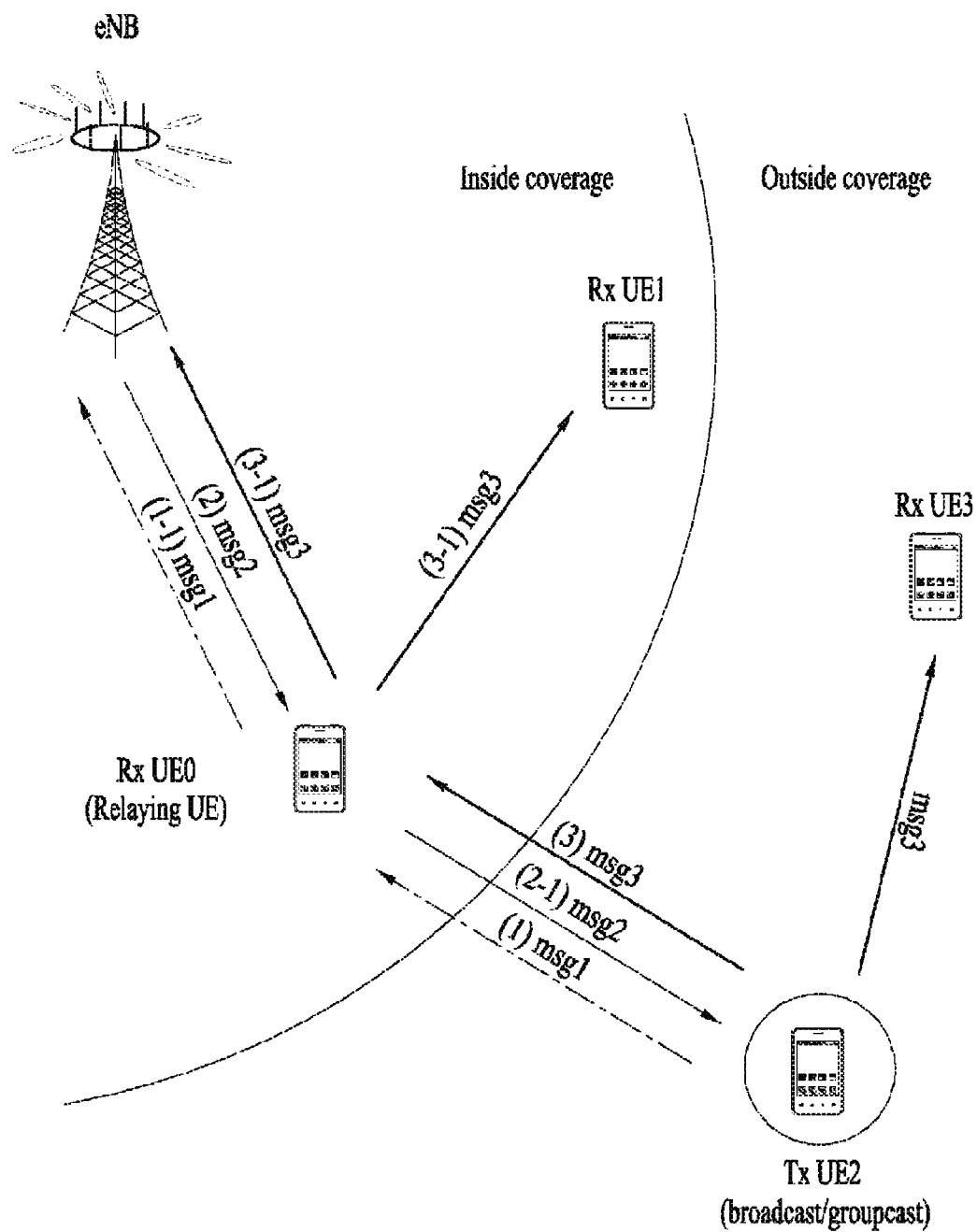
FIG. 23 is a diagram for an example of a D2D operation when a relaying UE and a cluster head are different from each other.

FIG. 23 shows an example of a procedure for a UE positioned at the outside of coverage to attempt broadcast or groupcast. An msg1, which is a broadcast request message, is delivered to a base station via a relaying UE0 (Rx UE0). The base station generates an msg2 in accordance with a situation of managing resources within coverage or like a PRACH RAR message and transmits the msg2 to a Tx UE (Tx UE2). A different point is to access the base station via the relaying UE and a message is delivered to a Tx UE positioned at the outside of coverage via the relaying UE. After an msg2-1 is delivered to the Tx UE via the relaying UE, the Tx UE transmits an msg3 to a resource region to which the msg3 is assigned. Although an Rx UE (Rx UE3) capable of receiving the msg3 of the Tx UE can directly receive the msg3, a UE (Rx UE1) incapable of receiving the msg3 of the Tx UE can receive the msg3 via the relaying UE.

Unlike the drawing, if direct reception is available, the Rx UE 1 directly receives the msg3 from the Tx UE2 and receives the msg3 again from the relaying UE. The Rx UE1 combines the msg3 with each other and may be able to enhance reception capability. It is able to receive relay from the base station as well.

Figure 24:
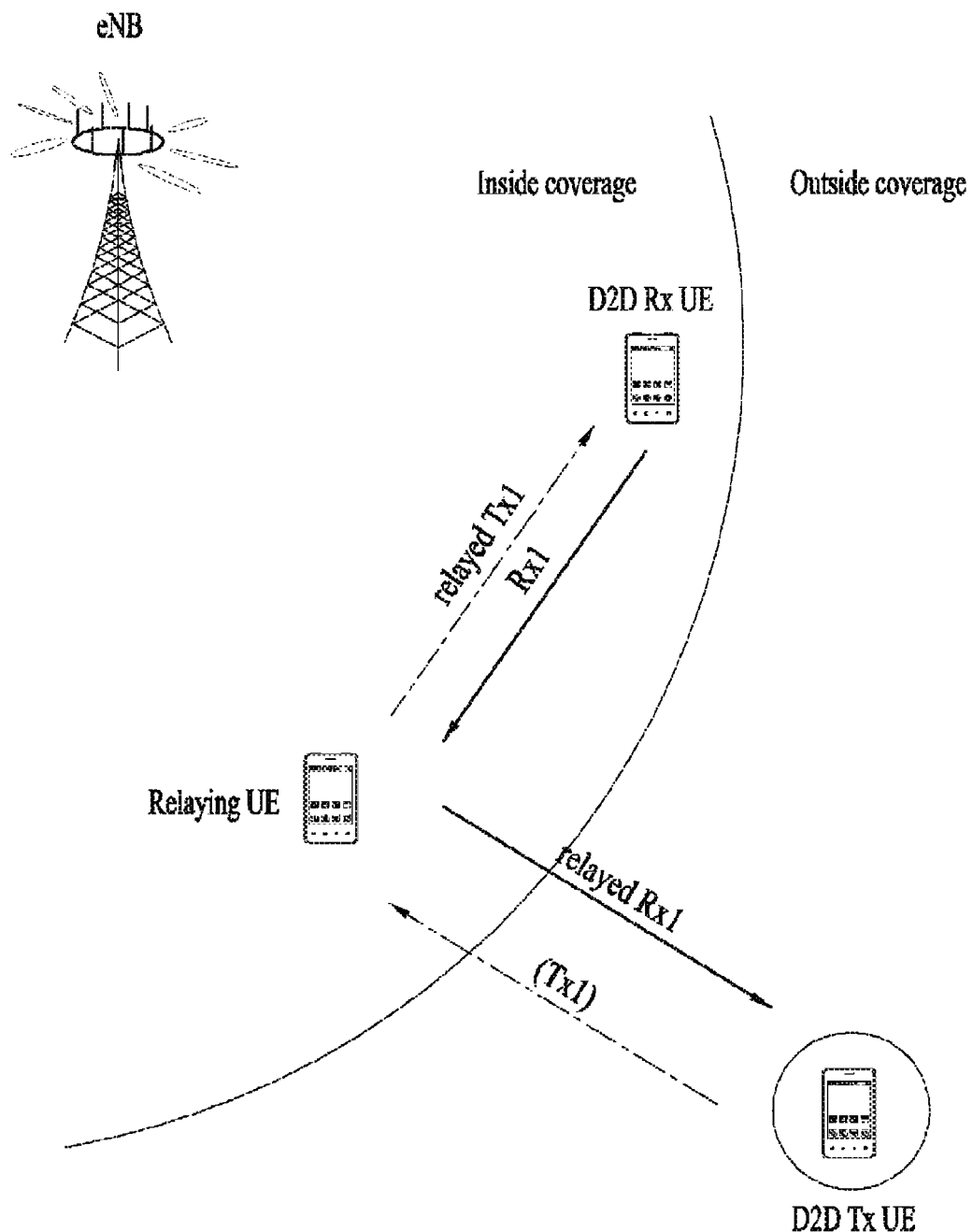
FIG. 24 is a diagram for a different example of a relaying operation performed by a D2D UE.

FIG. 24 is a diagram for a different example of a relaying operation performed by a D2D UE. Referring to FIG. 24, a relaying UE performs a function of a base station instead of the base station and may be able to provide a D2D communication link in a manner of connecting two D2D UEs with each other. One-hop D2D operation scheme/mode can be directly selected by a UE or can be configured in advance. Or, it is able to form 1-hop D2D link based on a recommendation of the relaying UE.

Figure 25:
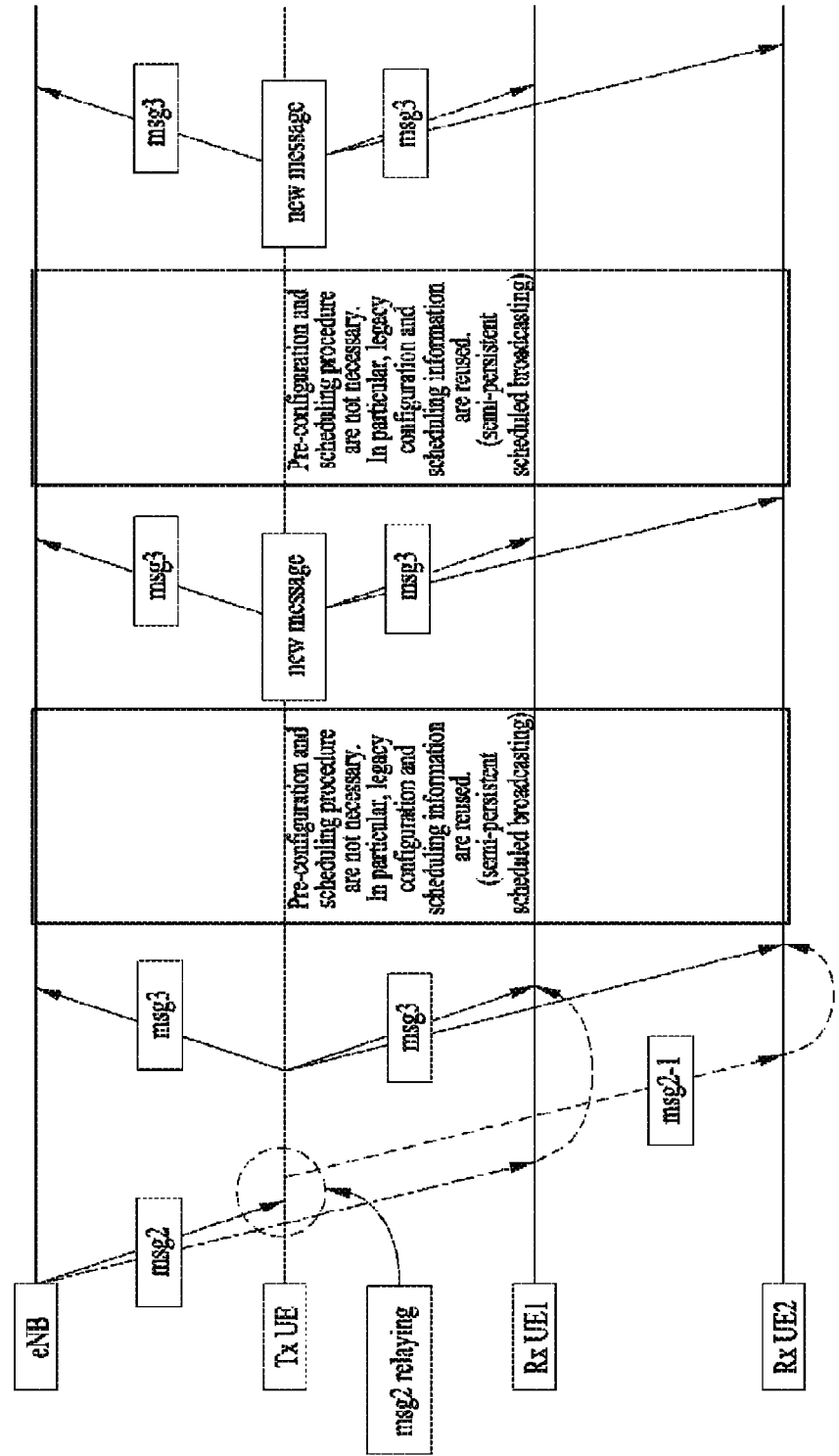
FIG. 25 is a diagram for a different example of performing D2D broadcast.

FIG. 25 is a diagram for a different example of performing D2D broadcast. Referring to FIG. 25, if there are many broadcast messages or it is necessary to transmit a message over several times, it may be more efficient to start the aforementioned procedure from a middle step rather than from the beginning. For example, it may be able to omit an msg1 transmission procedure and an msg2 transmission procedure. Instead, it is able to repeatedly perform an msg3 transmission procedure and an msg4 transmission procedure. The present example has a meaning that an msg3 is used as it is. Hence, scheduling information for transmitting an msg3 does not change or the scheduling information can be selected from predetermined resources (or resource indication values) according to a predetermined order.

Embodiment 2

Figure 26:
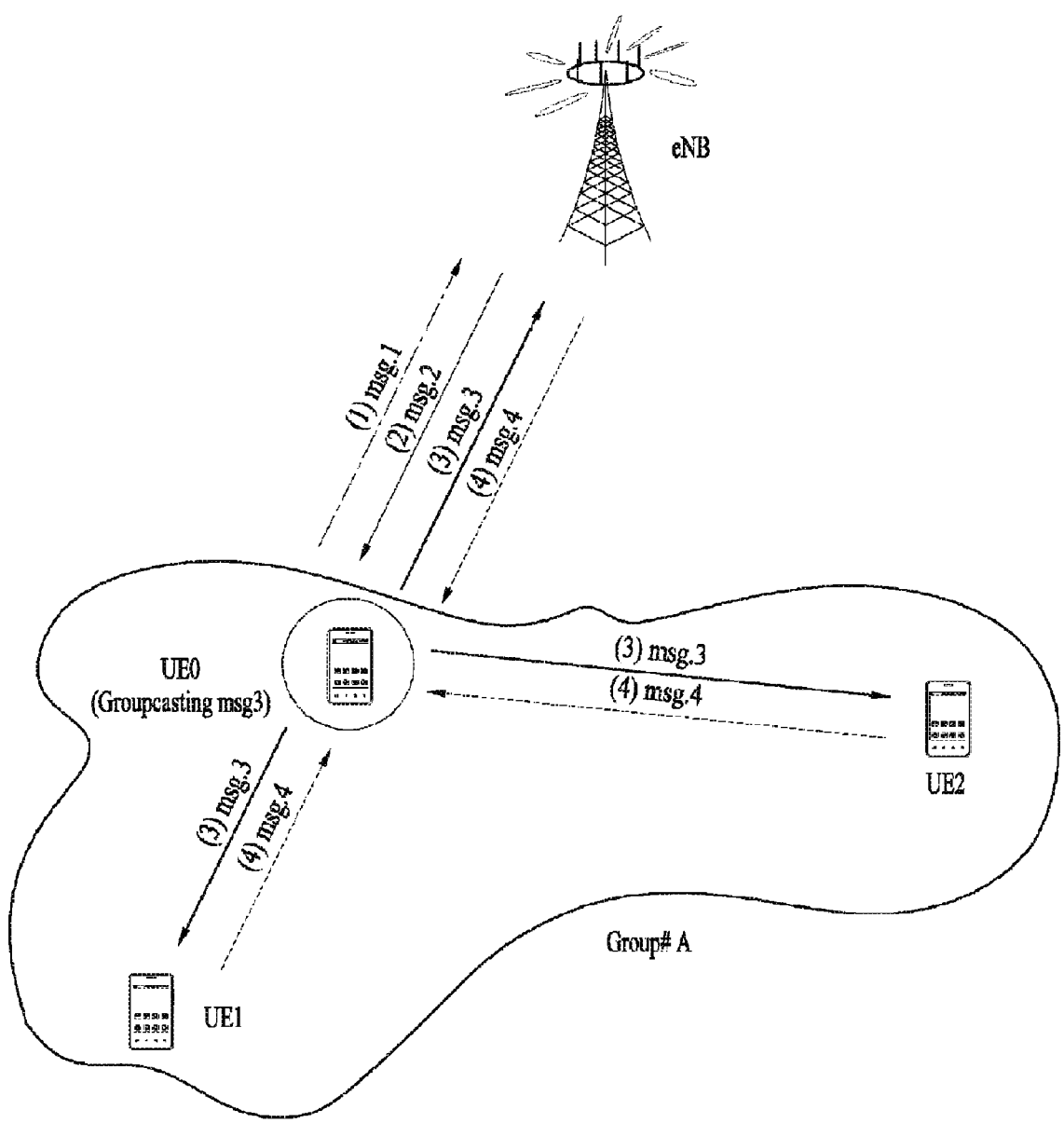
FIGS. 26 to 30 are diagrams for an example of a D2D operation based on D2D groupcast.
Figure 27:
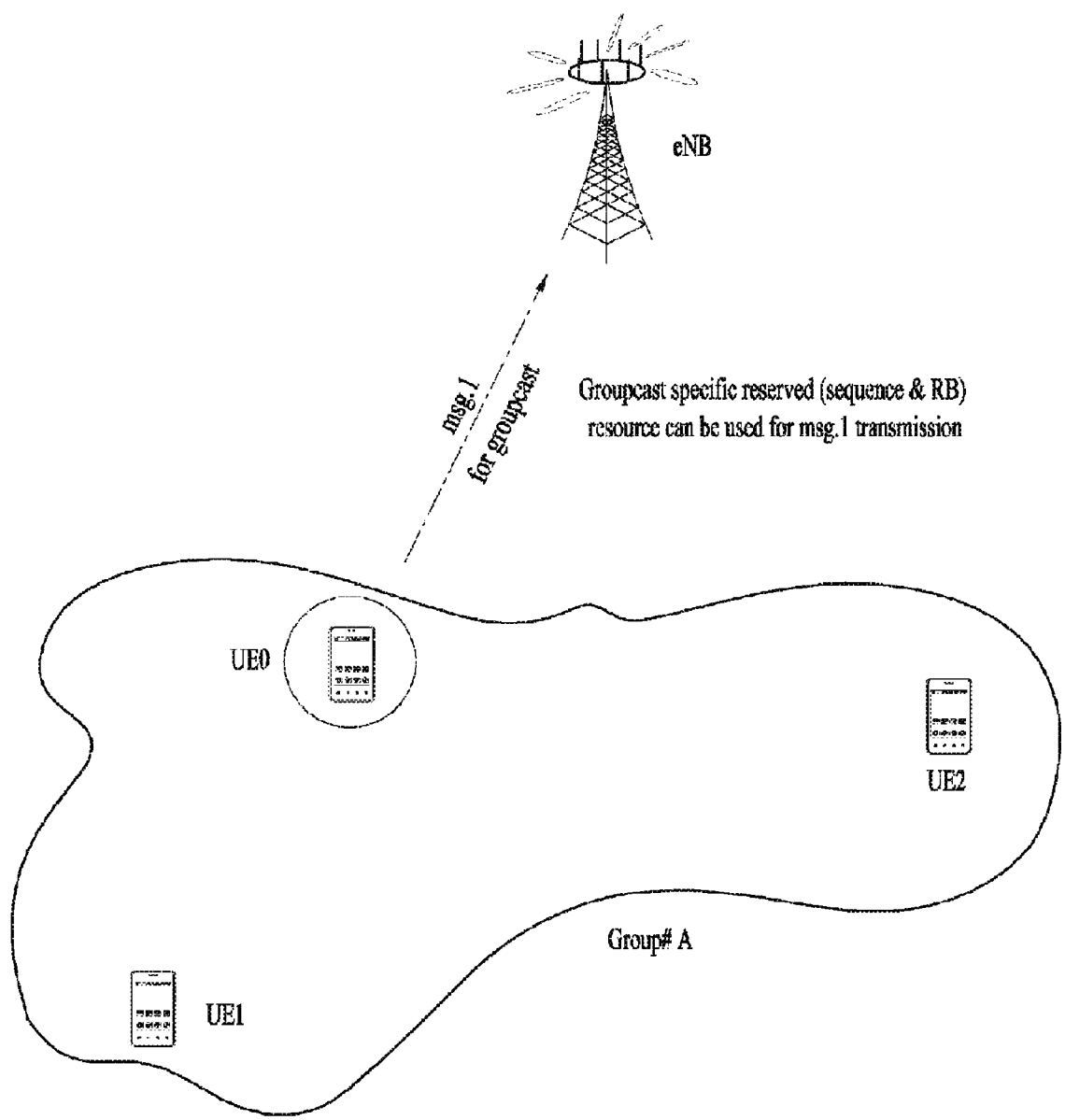
Figure 28:
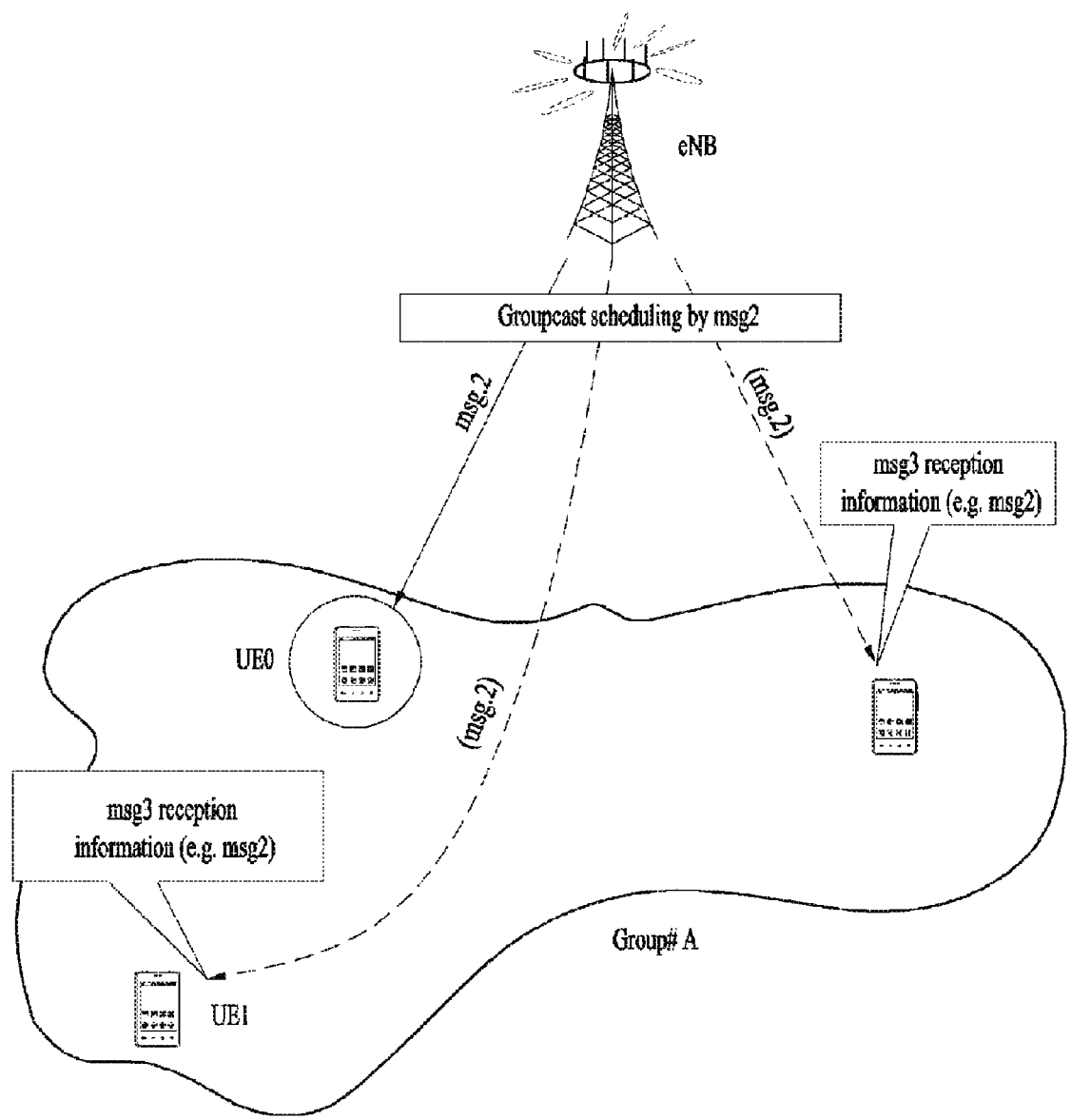
Figure 29:
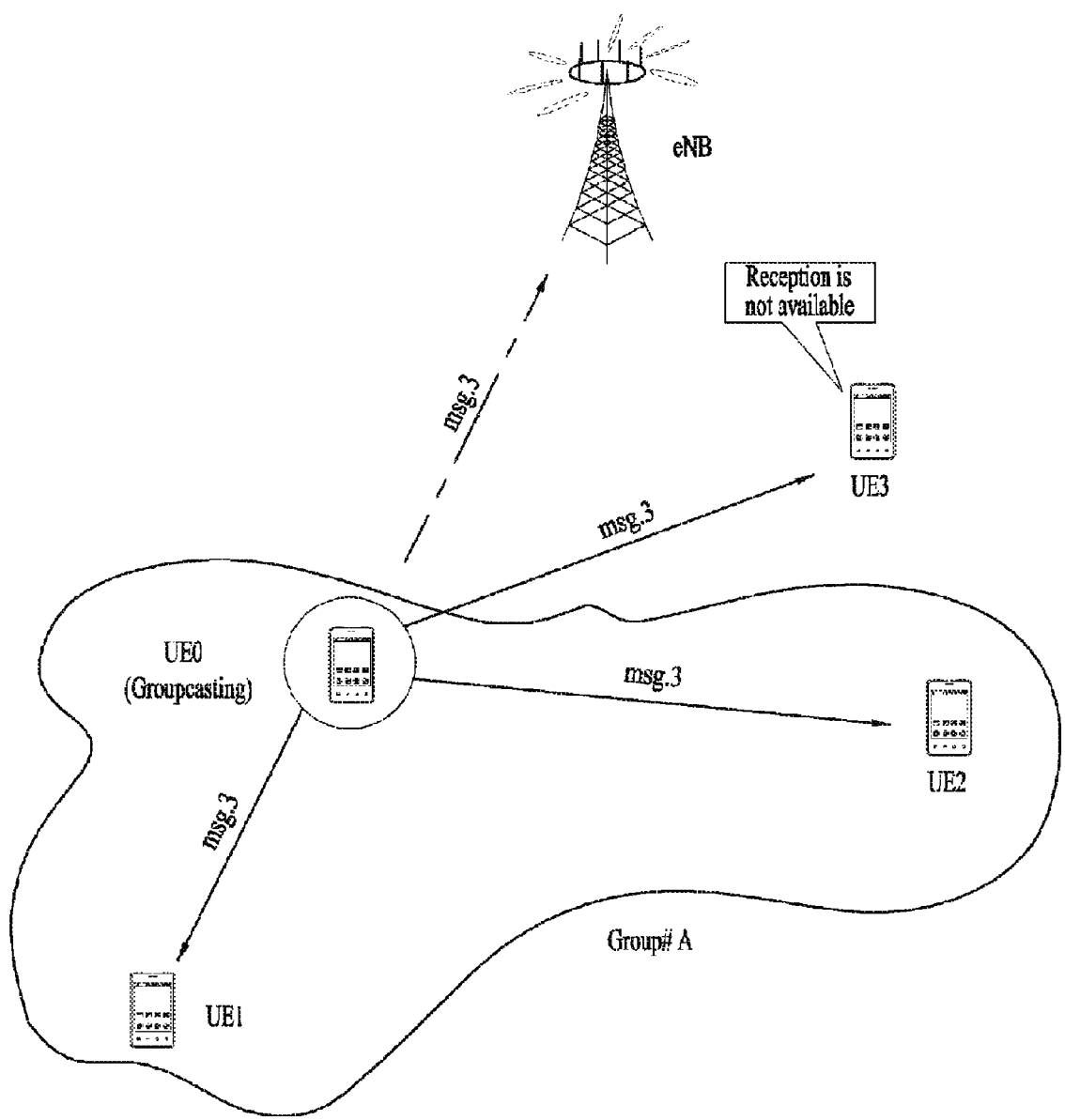
Figure 30:
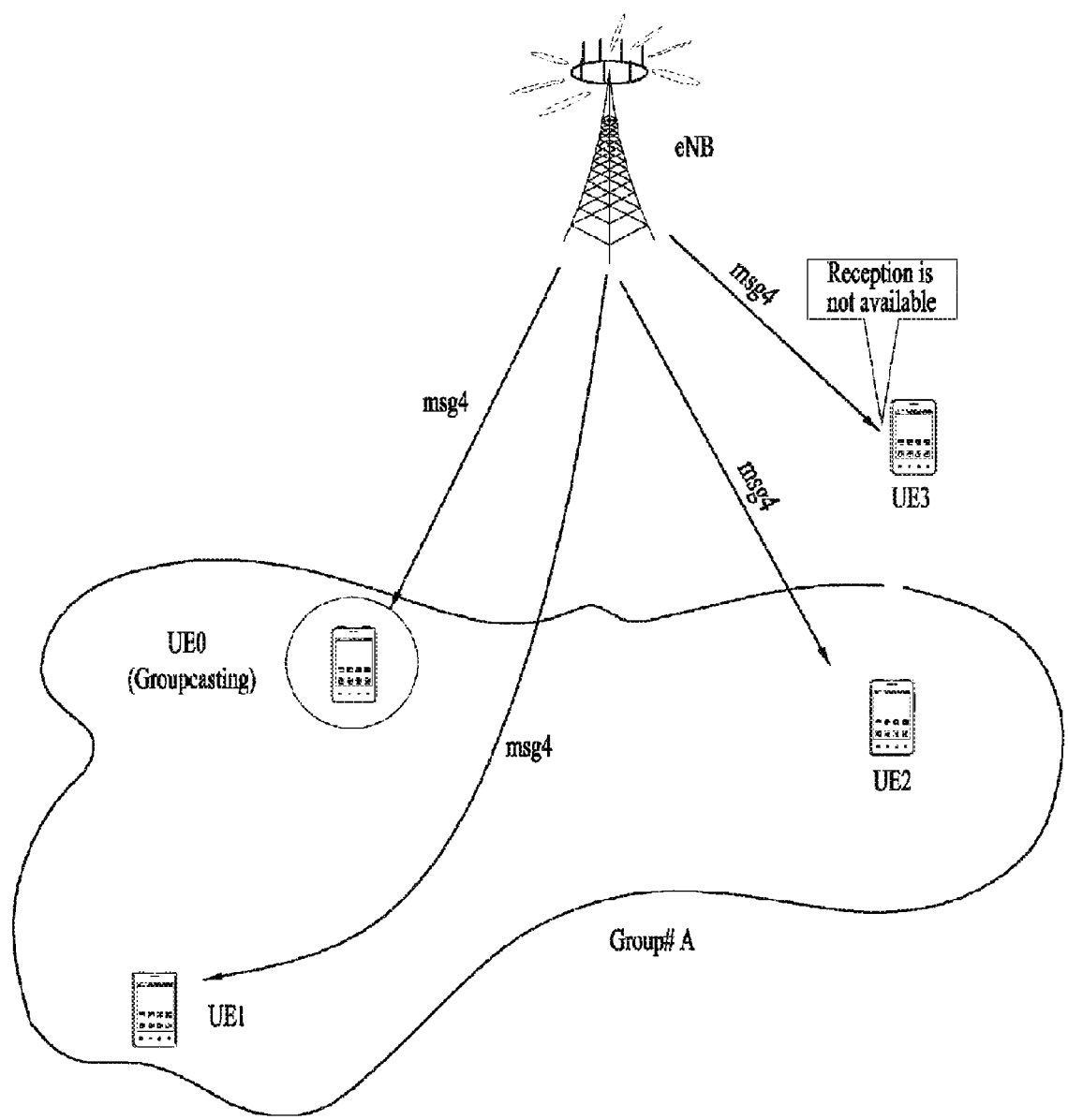

FIG. 26 is a diagram for an example of D2D groupcast performed at the inside of network coverage. An msg1, an msg2, an msg3 and an msg4 correspond to messages respectively corresponding to each step described in the following. Each of the steps described in the following is practically identical or similar to each step mentioned earlier with reference to FIG. 9.

Step #1: The msg1 corresponds to a signal delivered to a network/base station to satisfy an intention of transmitting a groupcast signal/message in a following step #3, a request for transmitting the signal/message or a request for a specific resource to transmit the signal/message. In a step #3, the msg1 can be considered as a scheduling request for requesting a resource to transmit an msg3. An object of the msg1 is similar to an object of a message 1 in a RACH procedure. The msg1 is delivered from a D2D UE to a specific base station/network. In some cases, other D2D UEs are able to listen to the msg1 (overhearing).

Step #2: The msg2 corresponds to a response signal transmitted by a base station in response to the step #1 (e.g., resource allocation or accept/reject to transmit an msg3). The msg2 delivers information (e.g., resource allocation, power control, timing advance, CP length, etc.) necessary for a D2D UE, which has requested the step #1, to transmit an msg3 groupcast signal. Assume that an Rx UE (an identical cell, a different cell) is ready for receiving the msg2 (delivery of advance information and the like).

Step #3: The msg3 corresponds to a signal used for a Tx UE, which has requested the step #1, to deliver a groupcast signal/message to a D2D Rx UE, a group or cluster head and/or a base station. The msg3 can be delivered to a designated D2D UE group only (reception target is restricted). Or, a base station receives the msg3 and may be then able to perform an appropriate reaction (relaying by a base station or repetitive transmission). Assume that an Rx UE is ready to receive the msg3.

Step #4: The msg4 corresponds to a signal for assisting the delivery of the msg3 or checking the msg3. The msg4 corresponds to a signal for informing of whether a signal is properly received in the step #3. If a signal is not properly received, the msg4 informs of a channel on which the signal is not properly received. Or, the msg4 may correspond to a signal for relaying the msg3 to a different Rx UE (group). In particular, a base station/network/relaying UE can groupcast the msg3 of the step #3 to a D2D Rx UE (group) at the time of transmitting the step #4.

The aforementioned steps are helpful to a UE in an RRC idle mode. According to a legacy technology, the UE in the RRC idle mode is unable to transmit and receive a discovery signal. Hence, a RACH procedure (for RRC connection) is required in advance to transmit a signal and it is necessary to listen to a paging signal in a DRX mode to receive a signal. If a UE listens to paging and has something to receive, the UE performs a procedure for switching to an RRC connection mode and receives a signal. Yet, according to the proposed scheme, it is able to deliver a groupcast message via the msg1, the msg2 and the msg3 procedure in the RRC idle mode. A reception UE wakes up from the RRC idle mode according to paging or a predetermined rule and may be then able to receive the msg3. Of course, although the reception UE is able to receive a signal in a manner of switching to the RRC connection mode according to the legacy technology, if there is no problem in receiving a signal in the RRC idle mode (e.g., a state that timing and synchronization are secured in advance), the reception UE wakes up at designated time and may be then able to receive the msg2 or the msg3.

Meanwhile, since an object of groupcast is to deliver a message to a designated UE group (specifically, members of a UE group) only, it is required to manage a group member UE. In particular, if a UE receives the msg3, it is necessary for the UE to transmit an appropriate response (e.g., msg4 or a scheme similar to the msg4) on whether or not the msg3 is received to a groupcast UE. For example, it is necessary to make such a response as HARQ AN. A group header and/or a base station analyze a response received from a group member and may be then able to determine whether to perform retransmission including individual retransmission and group retransmission or control transmit power, a modulation scheme/difference, a coding rate, a packet size and the like.

A technology and operation related to the msg1, the msg2, the msg3 and the msg4 and a mutual operating method between messages are described in the following in more detail with reference to FIGS. 27 to 30.

It is able to transmit the msg1 in consideration of groupcast. When the msg1 is transmitted by a preamble type (e.g., RCH initial access preamble), it is necessary to preferentially notify a candidate resource region (e.g., similar to PRACH configuration information) capable of transmitting the msg1. For clarity, configuration information for transmitting the msg1 is called D2D-group-configuration information. The D2D-group-configuration information is preferentially transmitted on a broadcast message (e.g., LTE MIB, SIB) and the msg1 can be transmitted in a subframe/RB assigned by the D2D-group-configuration information. A preamble index, a mask and the like necessary for transmitting a preamble can be used in a manner of reserving a groupcast-specific preamble sequence index or a parameter to distinguish the preamble index and the mask from unicast, a non-emergency case and the like. For example, preamble sequence indexes of a specific range can be reserved for the use of D2D groupcast among the total preamble sequence indexes available in a cell.

A scheduling request for groupcast is not considerably different from a scheduling request for unicast. A scheduling request channel is generated and the scheduling request for groupcast is delivered to a base station on the scheduling request channel. Although a UE in an RRC connection mode is able to use a LTE-based scheduling request (SR) channel, a UE in an RRC idle mode is unable to use the SR channel. Hence, the UE in the RRC idle mode transmits scheduling request information using an RACH channel. Since it is highly probable that most of D2D UEs exist in the idle mode, it may be able to transmit an RACH-based scheduling request, receive an allocated resource, and may be able to deliver a groupcast message using the allocated resource.

In case of supporting groupcast, it is able to receive a groupcast message at appropriate timing only when all members in a group are able to receive a groupcast scheduling command (e.g., msg2). It may be able to reserve a groupcast resource in advance. In order to receive the msg2, it may use a scheme (similar to RACH RAR) of decoding PDCCH and obtaining a response from a PDSCH region corresponding to PDCCH. In this case, PDCCH for the msg2 or EPDCCH RNTI may correspond to a group-RNTI instead of a RA-RNTI. To this end, it is able to configure group members to generate a group-RNTI based on a group ID in advance. Each Rx UE can perform blind decoding on PDCCH or EPDCCH in a common search space or a UE-specific search space based on a group-RNTI owned by the Rx UE. It is able to obtain a group-RAR (i.e., msg2) from a PDSCH region based on the detected information and may be then able to obtain scheduling information such as a resource region, transmit power and the like used for transmitting the msg3 from the group-RAR. 20-bit scheduling information in RAR is described in the following.

20-bit UL grant (random access response grant)
A. hopping flag—1 bit
B. resource block allocation information—10 bits
C. MCS (modulation and coding scheme)—4 bits
D. TPC command for PUSCH—3 bits
E. UL delay—1 bit
F. CSI request—1 bit Timing Relation Between Msg2 and Msg3

Figure 31:
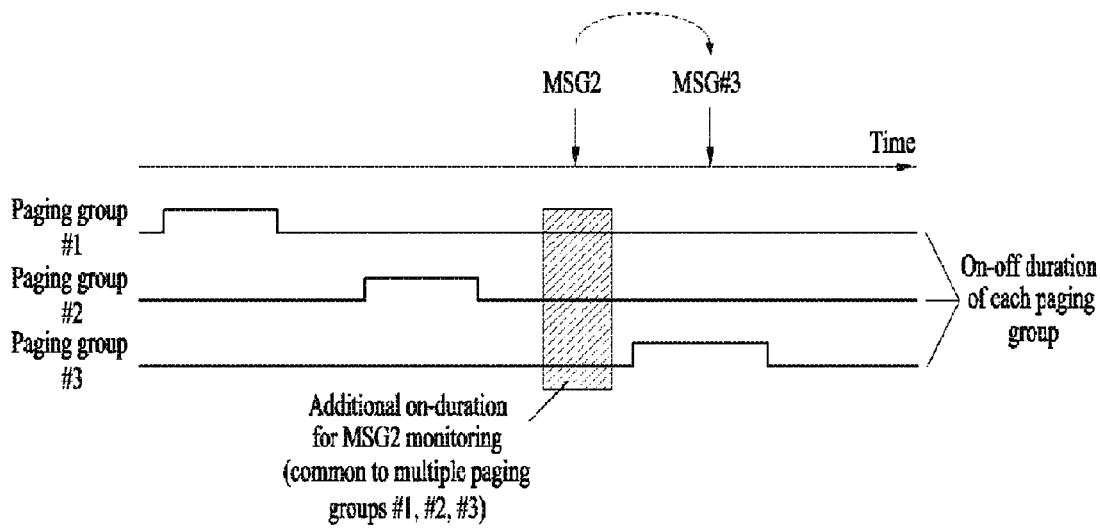
FIG. 31 is a diagram for an msg2 and msg3 transmission time relation in consideration of a paging group.

FIG. 31 is a diagram for an msg2 and msg3 transmission time relation in consideration of a paging group. In FIG. 31, assume that there exist three paging groups different from each other and each of the paging groups has on-off section at timing different from each other.

In this situation, as a method of enabling all Rx UEs to receive an msg2, it is able to make all paging groups of a D2D Rx UE have a separate on duration to listen to the msg2. In this case, it is able to deliver necessary msg2 information by a single msg2 transmission. Among UEs, which have received the msg2 information, a Tx UE transmits an msg3 at the time and a resource designated by the msg2 (broadcast) and the rest of Rx UEs will receive the msg3 at the time and a resource designated by the msg2.

In order to perform the aforementioned method, it may be preferable to define signaling for generating an additional section to listen to the msg2. And, although it is able to configure to return to a sleep/idle mode again (in DRX) in a period ranging from the timing of receiving the msg2 to the timing of broadcasting/receiving the msg3, if the timing of receiving the msg2 is associated with the timing of transmitting the msg3 (e.g., if there is an available resource after designated time elapses, transmission is performed), and the time is small enough, continuously maintaining an on state can be an another option. This is because a section between two messages can be utilized as time for a UE to ready to broadcast the msg3 or receive the msg2, i.e., time for the UE to sufficiently maintain time and frequency synchronization.

Moreover, in case of performing the operation shown in FIG. 31, since it is also necessary for Rx UEs to receive an msg4 from a base station, UEs in an idle mode, which have received the msg2, switch to an on state at least before the timing of transmitting the msg3 or the timing of transmitting the msg4 and can be regulated to ready to receive a corresponding signal. Of course, if the UEs in the idle mode do not receive the msg2, the UEs return to a general operation and receive no signal during an off duration, thereby avoiding battery consumption.

Figure 32:
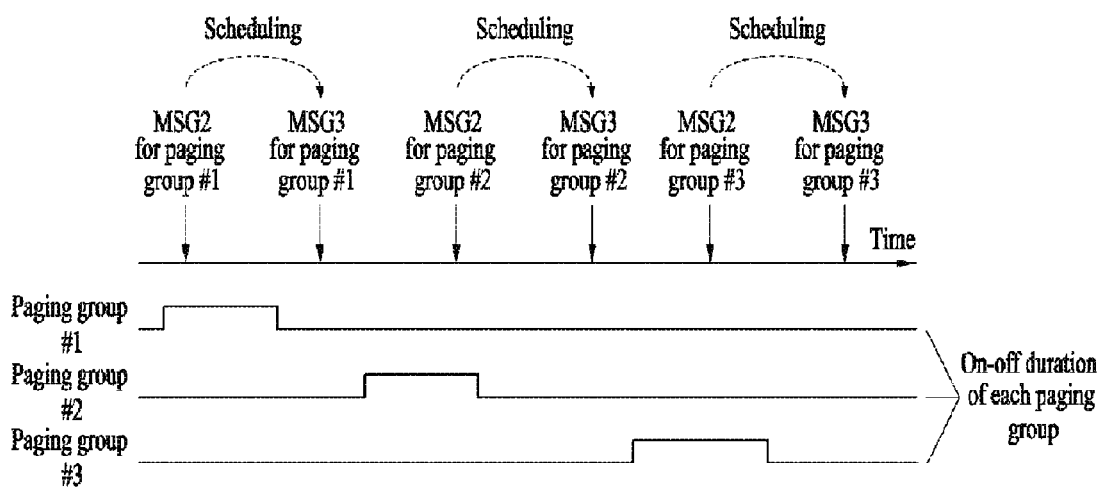
FIG. 32 is a diagram for an example of transmitting an msg2 in accordance with an ON section of a paging group of each UE and an example of transmitting an msg3 at the time designated by scheduling thereafter.

FIG. 32 is a diagram for an example of transmitting an msg2 in accordance with an ON section of a paging group of each UE and an example of transmitting an msg3 at the time designated by scheduling thereafter.

The basic assumption and the method mentioned earlier in the examples of FIG. 31 can be identically applied to the examples of FIG. 32. Yet, a big difference between the example of FIG. 31 and the example of FIG. 32 is in that the msg2 is transmitted several times in accordance with ON section of a paging group. In this case, timing of transmitting the msg3 is determined by scheduling and the msg3 can be transmitted in both a sleep mode and a wake-up mode. And, as mentioned in the foregoing description, the timing of transmitting the msg3 can be designated by a rule in advance (e.g., transmission after k time elapses) and can be designated in a manner of being coordinated according to scheduling timing/situation. Or, the msg3 can be transmitted within prescribed time by driving a timer.

Figure 33:
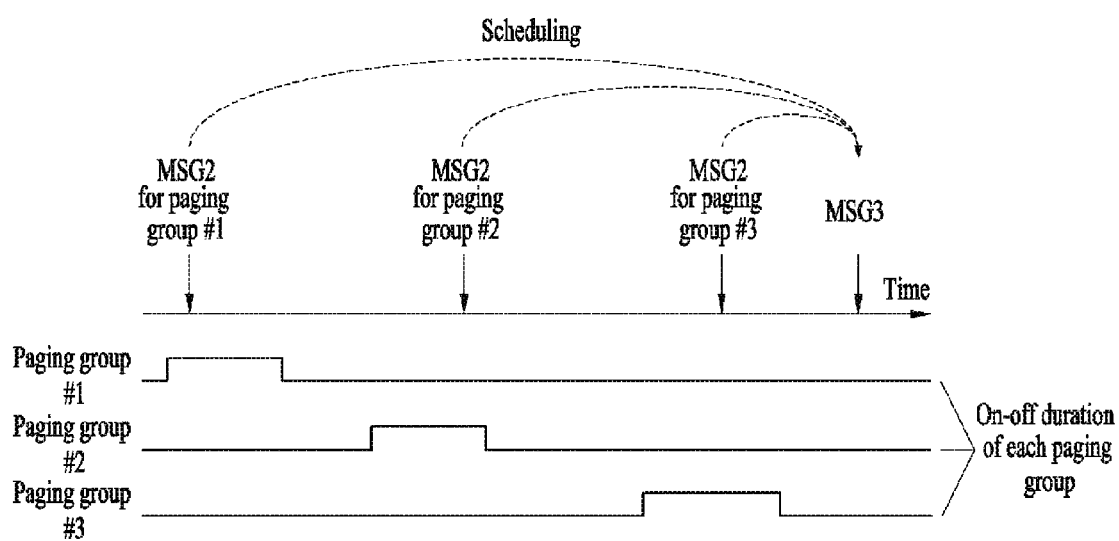
FIG. 33 is a diagram for explaining a timing relation between an msg2 and an msg3.

FIG. 33 is a diagram for explaining a timing relation between an msg2 and an msg3.

A difference between FIG. 33 and the aforementioned examples is in that the msg2 is individually transmitted in accordance with ON section of a paging group, whereas the msg3 is transmitted at appropriate timing after all paging groups receive the msg2. In the present embodiment, since the timing of transmitting the msg3 is most important, it is necessary to properly determine the timing. For example, it may be able to transmit the msg2 during ON section of a last paging group and may be then able to transmit or receive the msg3 after prescribed time elapses. Similarly, it is able to apply all of the aforementioned schemes.

In this case, it is also necessary to have a separate indication enabling both a transmitting Tx UE and a receiving Rx UE to listen at the timing of transmitting the msg3. A scheduling node (a base station or a cluster head) can inform a UE of timing of transmitting/receiving the msg3 or timing of transmitting a last msg2.

In FIG. 33, in case of a paging group #1, it may take great amount of time until the timing of transmitting the msg3. Hence, mode selection is important during the time period. If there exists information indicating the timing of transmitting the msg3, it may be able to maintain a sleep mode for a while.

As different information, if there is information indicating how many paging groups exist or information indicating how many times msg2 transmission is to be performed (when paging group classification is unclear), it is able to anticipate the timing of transmitting the msg3 and timing of receiving the msg3. The information on the paging groups and the information on the times of transmitting the msg2 can be delivered from a base station to a UE. In the aspect of a UE transmitting a groupcast signal, it is preferable for the UE to identify that the msg2 is transmitted as many as a designated count and transmit the msg3 after transmission of a last msg2 is completed. In particular, although an msg2 existing in the middle is detected, it is preferable not to transmit the msg3.

Alternately, a field indicating how many msg2 transmissions are left can be included in the msg2 transmitted by a base station. The field can be comprehended as a counter for the number of msg2, which are to be transmitted after each msg2. In particular, a msg2 of which the counter indicates 0 can be considered as a last msg2. Or, if it is possible to precisely designate the timing of transmitting the msg3 via the msg2 (e.g., a subframe number and a radio frame number), a UE can transmit the msg3 at single transmission timing, which is repeatedly indicated by the msg2, although the UE receives the msg2 couple of times.

As an additional action, it may be able to designate a space between paging groups (a space between ON sections of paging groups) and a space between msg3 to be an integer multiple of a specific unit. Or, it may be able to schedule paging groups or timing of transmitting/receiving the msg3 to make the space to be the integer multiple of the specific unit. The tip can be helpful when timing verification is performed. For example, msg2 for a PG #1 and msg2 for a PG #2 are determined by N time unit, msg2 for a PG #2 and msg2 for a PG #3 are determined by M time unit and msg2 for a PG #3 and msg2 for a PG #4 are determined by K time unit. In this case, it is preferable to make N, M and K to be an integer multiple of a legacy timing unit. A timing unit may become N, M or K. Or, the timing unit may become the least common multiple or the greatest common denominator of paging candidate timing (paging frame).

Figure 34:
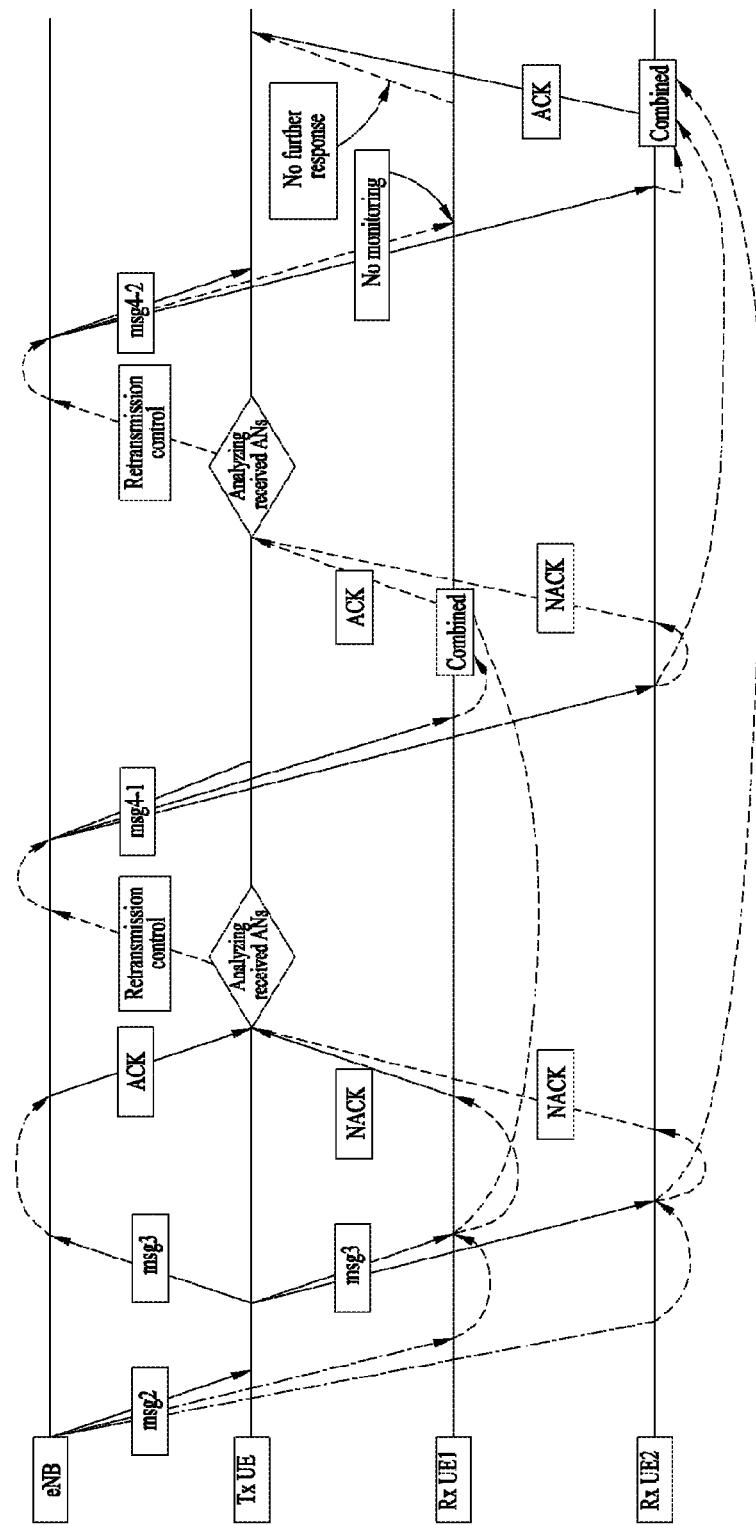
FIG. 34 is a diagram for an example of a HARQ operation based on a D2D groupcast.

FIG. 34 is a diagram for an example of a HARQ operation based on a D2D groupcast. The present example shows a case that a base station performs retransmission. In this case, assume that there exist a single Tx UE and two Rx UEs.

Referring to FIG. 34, a Tx UE receives msg2 from a base station and obtains control information necessary for transmitting msg3 from the msg2. Since it is necessary for all of the rest of UEs within a group to receive msg3 (groupcast message), the UEs should know msg3 scheduling information. In order to simply obtain the msg3 scheduling information, it is able to make all UEs in the group receive the msg2. Hence, it is able to make all UEs in the group decode the msg2 using a group-RNTI. The group-RNTI should be shared with each other in advance. As an example, the group-RNTI can be generated based on a group ID. In order to make a plurality of UEs receive PDCCH related to the msg2, the PDCCH related to msg2 can be transmitted in a common search space. Or, in the aspect of a group-specific, the PDCCH related to the msg2 can be transmitted in a UE-specific search space. Yet, it is able to reduce blind decoding complexity by informing/fixing a search space in advance. The Tx UE uses the msg2 to generate and transmit the msg3, whereas the Rx UEs use the msg2 to decode the msg3. Hence, an object of the msg2 may vary according to a UE.

Subsequently, if the groupcast msg3 is transmitted, both the base station and the Rx UE receive and decode the msg3. In this case, various situations may occur. There may exist an Rx UE or a base station succeeded in receiving the msg3 and an Rx UE or a base station failed to receive the msg3. FIG. 34 shows a case that the base station has succeeded in receiving the msg3 but an Rx UE1 and an Rx UE2 have failed to receive the msg3. Since the base station has succeeded in receiving the msg3, the base station transmits ACK to the Tx UE in response to the msg3. A HARQ-AN may be replaced with an msg4. On the contrary, since the Rx UE1 and the Rx UE2 have failed to receive the msg3, the Rx UE1 and the Rx UE2 transmit NACK to the Tx UE in response to the msg3. As an example of a method for the Rx UE1 and the Rx UE2 to transmit HARQ-AN, it may be able to use an RACH message 4 type, an msg4-1 and msg4-2 type generated by the base station for the purpose of retransmission shown in FIG. 34, PHICH of a simple response type, or a PUCCH format. An msg3 HARQ response can be implemented by 4 options described in the following.

RACH message 4 type (in case of a base station or a D2D Rx UE)

Msg 4 type of proposed method (in case of a base station or a D2D Rx UE)

PHICH format (in case of a base station or a D2D Rx UE)

PUCCH Format (in Case of a D2D Rx UE)

Meanwhile, it may use three options described in the following in relation to a main entity of retransmission.

Retransmission performed by a base station

Retransmission performed by a Tx UE

Retransmission performed by a base station and a Tx UE

If all responses received from a plurality of Rx UEs correspond to ACK, a Tx UE delivers a new groupcast message according to a necessity. If all responses received from a plurality of the Rx UEs correspond to NACK, the Tx UE and/or a base station can attempt msg3 retransmission (msg4). Yet, as shown in FIG. 34, if ACK and NACK exist in a manner of being mixed, a separate operation is required. For example, if a prescribed % compared to the number of group members or the number of group members equal to or greater than a prescribed number transmit ACK, the Tx UE determines it as the msg3 is successfully delivered and may be then able to transmit a new groupcast message according to a necessity. On the contrary, if ACK equal to or less than a prescribed condition is received, the Tx UE and/or the base station can perform msg3 retransmission. In terms of NACK, if a prescribed % compared to the number of group members or the number of group members equal to or greater than a prescribed number transmit NACK, the Tx UE determines it as the msg3 delivery has failed. If NACK equal to or less than a prescribed condition is received, the Tx UE and/or the base station can determine it as msg3 delivery has succeeded. In the aforementioned example, both ACK and NACK are used as a response and it is able to determine whether or not the msg3 delivery is successful based on a distribution of each of the ACK and the NACK. Yet, although one of the two response states (ACK and NACK) is used only, it is also able to determine whether or not the msg3 delivery is successful using an identical determination scheme. In case of using one of the two response states only, it may differently configure a signal constellation. For example, it may use an ON/OFF keying scheme instead of BPSK (binary phase shift keying) or QPSK (quadrature phase shift keying). In this case, an Rx UE can transmit a signal including specific energy to make a response of NACK and transmit a signal including zero energy (or very small energy) to make a response of ACK. Since it is highly probable that most of Rx UEs transmits ACK, NACK is designated to a constellation point including energy instead of ACK. By doing so, it is able to reduce overall transmit power consumed for making a response. Yet, since a reference may vary according to a characteristic of groupcast, a constellation point of ACK and a constellation point of NACK can be managed in a manner of being changed.

If it is determined to perform msg3 retransmission based on a HARQ response, the Tx UE can perform the msg3 retransmission by itself or delivers an appropriate command (e.g., retransmission control information, a retransmission indicator) to the base station to make the base station indicate the msg3 retransmission. A redundancy version (RV) may change in the middle of performing the msg3 retransmission. In this case, an RV order can be designated in advance.

If the retransmission is performed by the base station, the Tx UE collects all HARQ responses, analyze the responses, determines whether a next transmission corresponds to a new transmission or a retransmission and informs the base station of a result of the determination. In case of performing the retransmission, the base station performs the retransmission in a manner of taking out an msg3, which is previously stored in a reception buffer. In case of performing a new transmission, the base station deletes a previously stored msg3 and waits for receiving a new msg3 from the Tx UE. In case of transmitting NACK, the Rx UE monitors timing of transmitting msg4-1 and receives the msg4-1.

Although FIG. 34 shows a case that a retransmission indicator is delivered to the base station only, it is preferable to deliver the retransmission indicator to Rx UEs as well to monitor retransmission timing of the base station. In particular, the retransmission indicator can be helpfully used as information for calculating Rx monitoring timing. Or, if it is able to deliver more information to the retransmission indicator, it may be able to notify absolute time.

As a rare case, when the Rx UE transmits NACK and waits for retransmission, a case that retransmission is not performed may occur. This is because, if it is assume that the sufficient number of Rx UEs receive a broadcast message on the basis of AN analysis of the Tx UE, it is not necessary to perform the retransmission anymore. Hence, in this case, it is necessary to explicitly describe a UE operation. In particular, the Rx UE operates a timer while transmitting NACK. If retransmission is not performed during prescribed time, the Rx UE expires the timer and assumes that msg3 transmission is terminated in a state of not receiving the msg3. In particular, the msg3 message loss occurs.

In the aforementioned proposed scheme, a retransmission procedure can be simplified. For example, it may be able to set a limit on the number of retransmission to 1 or 2. For example, when the number of performing the retransmission is set to 1, if the msg3 is retransmitted one time, the Tx UE does not receive HARQ AN and the Rx UE may not reply the HARQ AN. By doing so, it may be able to save a corresponding resource. Yet, it is necessary to transmit a signal capable of forming sufficient reception coverage by a single retransmission only, in particular, to enable the sufficient number of UEs to receive a groupcast message. For example, it is able to configure channel coding, transmit power and MCS enabling most of Rx UEs to receive initial transmission.

Meanwhile, as a different rare case, when the Rx UE succeeded in receiving the msg3 and replied ACK, if a retransmission message continuously arrives, it may be able to normally ignore the message. If an upper limit value of performing retransmission is determined in advance, the Rx UE can calculate the number of ignoring the retransmission message. If the number of performing the retransmission is restricted, it may use an approaching method of a different type. In particular, instead of transmitting HARQ AN in response to every msg3 transmission, if the restricted number of retransmissions are all completed, it may be able to perform soft combining on all received message blocks and transmit a HARQ response in response to the soft combined message blocks. As a different method, it may be able to request a HARQ response in response to an initial transmission only and it may be able to notify that it is not necessary to transmit the HARQ response in response to retransmission. In particular, the HARQ response is mandatory for the initial transmission only and the HARQ response is not mandatory for the rest of transmission. In this case, a firstly transmitted HARQ response is used for estimating a channel and it is able to determine transmit power, channel coding, MCS and the like for an initial transmission message based on a value of the estimated channel. Meanwhile, in case of continuously transmitting a groupcast message, it may not request a HARQ response in response to every groupcast message. In this case, if a prescribed period or time elapses, it may be able to make a HARQ response in response to groupcast messages received during the period or the time at a time. As an example, it may be able to make a HARQ response to be made only when prescribed time elapses on the basis of such a value explicitly given by time as a specific subframe or when a subframe index corresponds to a multiple of a specific number (e.g., a integer equal to or greater than 2). For example, a HARQ response can be transmitted in a subframe satisfying '(10*SFN+SF) mod N=0' only. In this case, SFN (super frame number) corresponds to a radio frame index, SF corresponds to a subframe index in a radio frame, mod indicates modulo calculation and N indicates a specific number.

Figure 35:
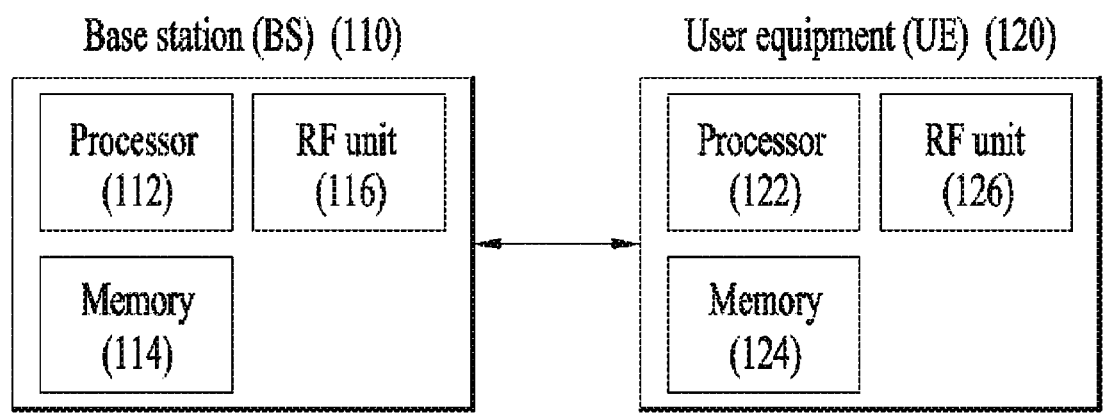
FIG. 35 is a block diagram of a Base Station (BS) and a User Equipment (UE) according to an embodiment of the present invention.

FIG. 35 shows an example of a base station and a UE applicable to embodiments of the present invention. A UE includes a D2D UE. If a D2D communication link is established, a base station (BS) 110 and a user equipment (UE) 120 can be replaced with a first D2D UE 110 and a second D2D UE 120, respectively.

Referring to FIG. 35, the base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term 'BS' may be replaced with the term fixed station, Node B, evolved Node B (eNode B or eNB), Access Point (AP), etc. The term 'terminal' may be replaced with the term UE, Mobile Station (MS), Mobile Subscriber Station (MSS), Subscriber Station (SS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be applied to a method of using D2D (device to device) communication in a wireless communication system and an apparatus therefor.

What is claimed is:

1. A method of performing a HARQ (hybrid automatic repeat request) procedure, which is performed by a first D2D (device-to-device) UE in a wireless communication system, comprising the steps of:
receiving data from a second D2D UE;
transmitting a HARQ response to the second D2D UE in response to the data; and
if the HARQ response corresponds to NACK (negative acknowledgement),
receiving a retransmission indicator from the second D2D UE at a first timing, and
receiving a retransmission signal from a base station in response to the data at a second timing,
wherein the second timing is determined based on the first timing.

2. The method of claim 1, further comprising:
receiving a PDCCH (physical downlink control channel) scheduling the data,
wherein a CRC (cyclic redundancy check) of the PDCCH scheduling the data is masked with a group-RNTI (radio network temporary identifier), and
wherein the group-RNTI is determined based on a group ID (identifier) of a group to which the first D2D UE and the second D2D UE belong thereto.

3. The method of claim 1,
wherein, if the data includes a plurality of continuously received data, the HARQ response is transmitted in a subframe satisfying (10*SFN+SF) mod N=0 only,
wherein the SFN corresponds to a radio frame index,
wherein the SF corresponds to a subframe index in a radio frame,
wherein the mod indicates a modulo calculation, and
wherein the N corresponds to an integer equal to or greater than 2.

4. The method of claim 1, wherein if the HARQ response corresponds to ACK, transmission of the HARQ response signal is omitted at a timing assigned to transmit the HARQ response.

5. A first D2D (device-to-device) UE configured to perform a HARQ (hybrid automatic repeat request) procedure in a wireless communication system, comprising:
an RF (radio frequency) unit; and
a processor, the processor configured to
receive data from a second D2D UE, transmit a HARQ response to the second D2D UE in response to the data, and
if the HARQ response corresponds to NACK (negative acknowledgement),
receive a retransmission indicator from the second D2D UE at a first timing, and
receive a retransmission signal from a base station in response to the data at a second timing,
wherein the second timing is determined based on the first timing.

6. The first D2D UE of claim 5,
wherein the processor is further configured to receive a PDCCH (physical downlink control channel) scheduling the data, and
wherein a CRC (cyclic redundancy check) of the PDCCH scheduling the data is masked with a group-RNTI (radio network temporary identifier), and
wherein the group-RNTI is determined based on a group ID (identifier) of a group to which the first D2D UE and the second D2D UE belong thereto.

7. The first D2D UE of claim 5,
wherein, if the data includes a plurality of continuously received data, the HARQ response is transmitted in a subframe satisfying (10*SFN+SF) mod N=0 only,
wherein the SFN corresponds to a radio frame index,
wherein the SF corresponds to a subframe index in a radio frame,
wherein the mod indicates a modulo calculation, and
wherein the N corresponds to an integer equal to or greater than 2.

8. The first D2D UE of claim 5, wherein if the HARQ response corresponds to ACK, transmission of the HARQ response signal is omitted at a timing assigned to transmit the HARQ response.

* * * * *